United States Patent
Nemoto

(10) Patent No.: US 6,982,833 B2
(45) Date of Patent: Jan. 3, 2006

(54) ERECT IMAGE RESIN LENS ARRAY AND THE MANUFACTURE THEREOF

(75) Inventor: Hiroyuki Nemoto, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 45 days.

(21) Appl. No.: 10/283,859

(22) Filed: Oct. 30, 2002

(65) Prior Publication Data

US 2003/0081312 A1 May 1, 2003

(30) Foreign Application Priority Data

| Nov. 1, 2001 | (JP) | 2001-336691 |
| Nov. 1, 2001 | (JP) | 2001-336709 |
| Jun. 20, 2002 | (JP) | 2002-180173 |

(51) Int. Cl.
*G02B 27/10* (2006.01)
(52) U.S. Cl. ...................... 359/626; 359/625
(58) Field of Classification Search ............... 359/626, 359/618–622, 628, 625
See application file for complete search history.

(56) References Cited

U.S. PATENT DOCUMENTS

| 6,381,072 B1 * | 4/2002 | Burger ........................ 359/622 |
| 6,693,748 B1 * | 2/2004 | Fujimoto et al. ............ 359/621 |
| 2001/0028506 A1 * | 10/2001 | Fujimoto et al. ............ 359/622 |

FOREIGN PATENT DOCUMENTS

WO    WO 00/58762    10/2000

* cited by examiner

*Primary Examiner*—Scott J. Sugarman
*Assistant Examiner*—Joseph Martinez
(74) *Attorney, Agent, or Firm*—RatnerPrestia

(57) ABSTRACT

A resin lens plate has, on its planar surface, convex lenslets arranged in a regular pattern with adjacent lenslets being apart from each other by a specified center-to-center pitch. Each of the convex lenslets has a rectangular or hexagonal contour in a plan view of the plate, and the lenslets are arranged such that the direction in which the center-to-center distance between adjacent lenslets takes a maximum value is in parallel with the lengthwise side of the plate. A groove or a ridge is formed along the bisector of a center-to-center line drawn between each pair of adjacent lenslets, and a light absorbing film is formed over the groove or the ridge. The groove or ridge inhibits the entry of stray light to the lenslet from adjacent lenslets.

27 Claims, 22 Drawing Sheets

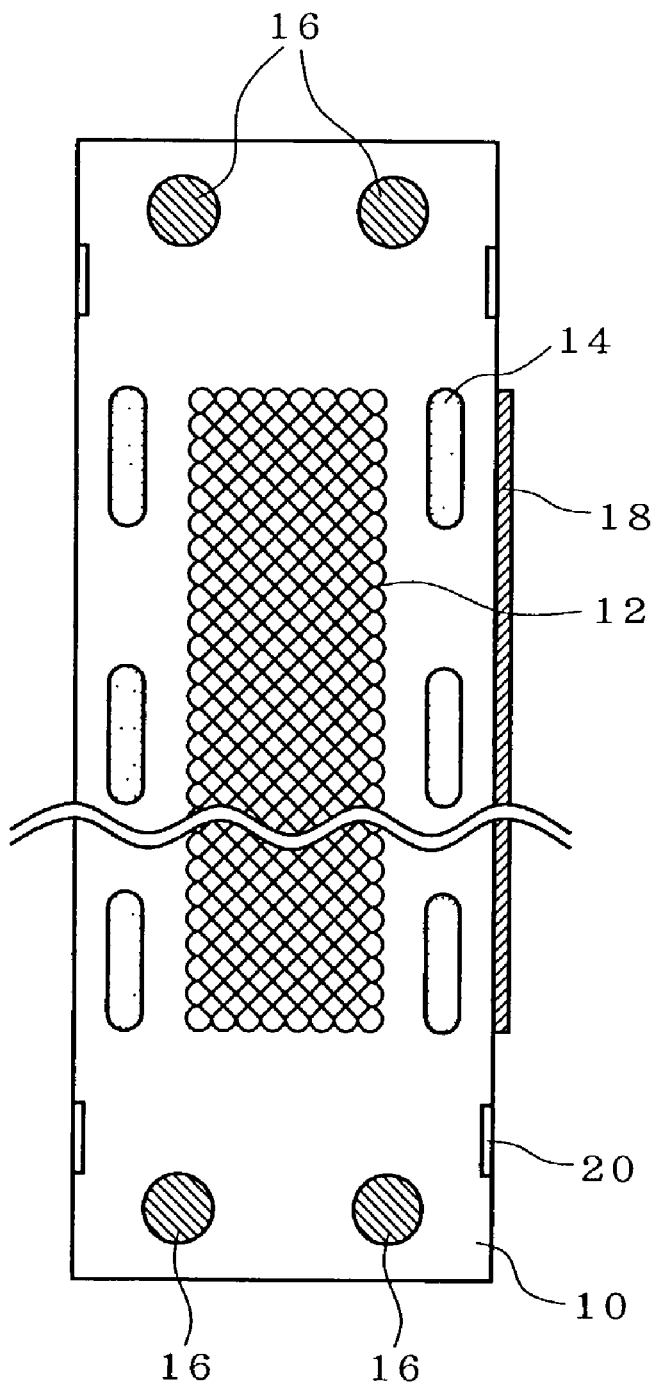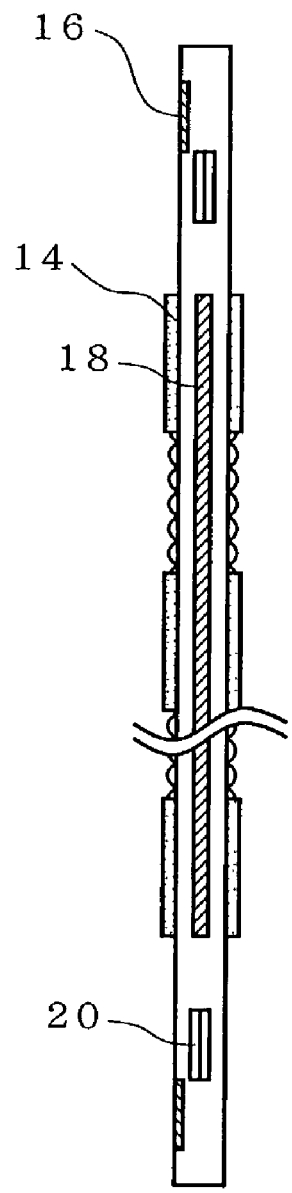
FIG. 1A                    FIG. 1B

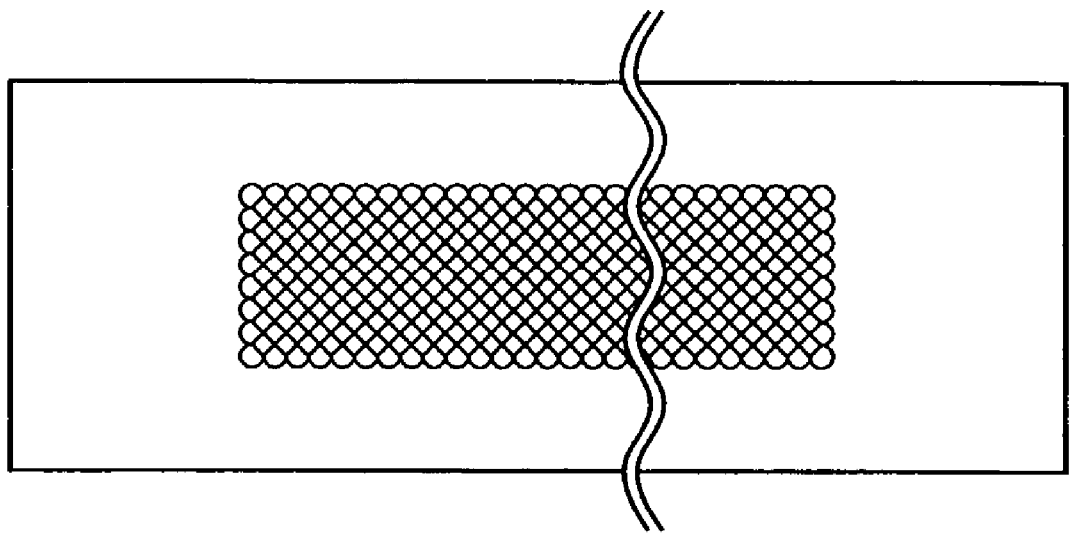
F I G. 2 A
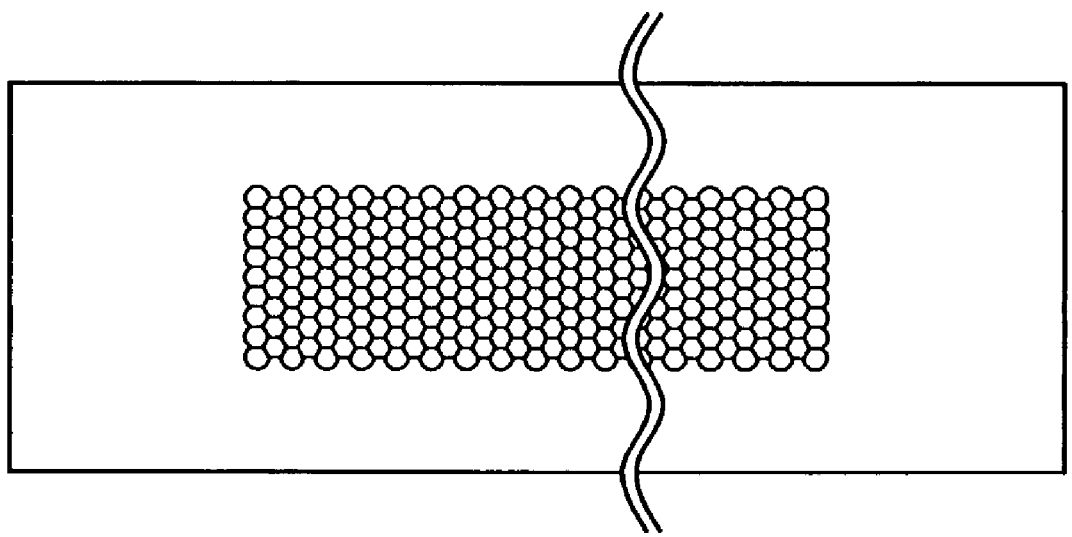
F I G. 2 B

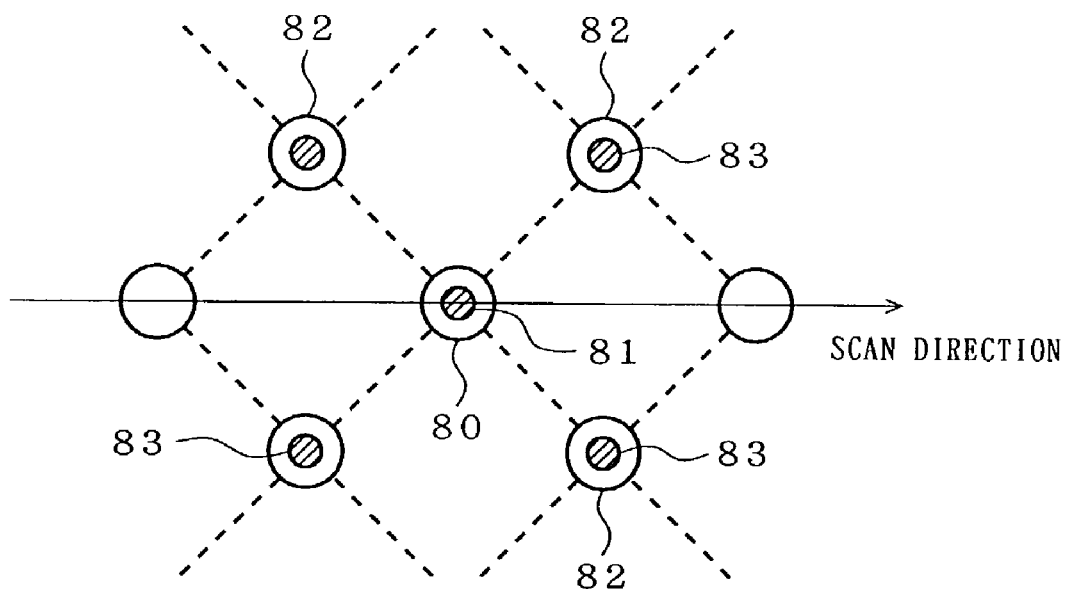
F I G. 3A
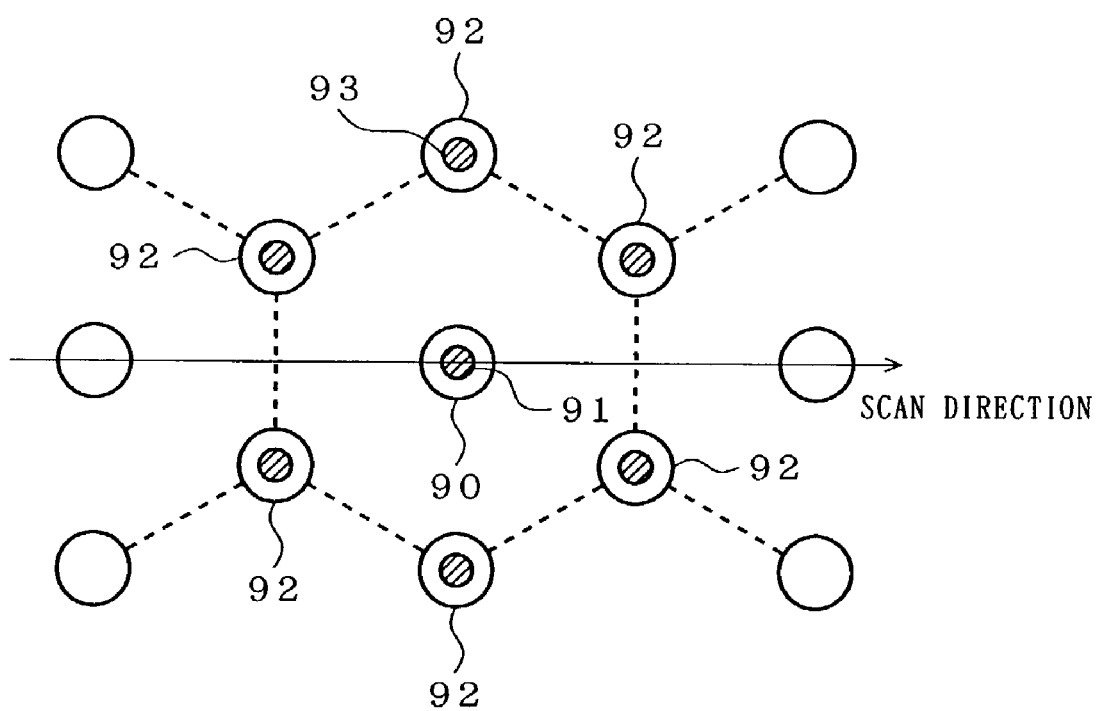
F I G. 3B

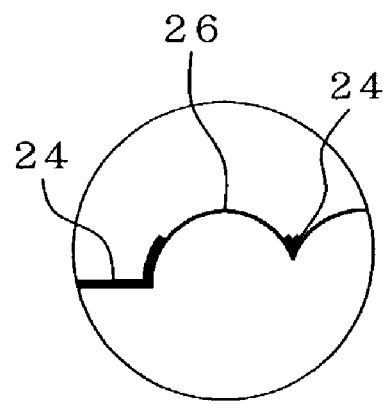
F I G. 5 A
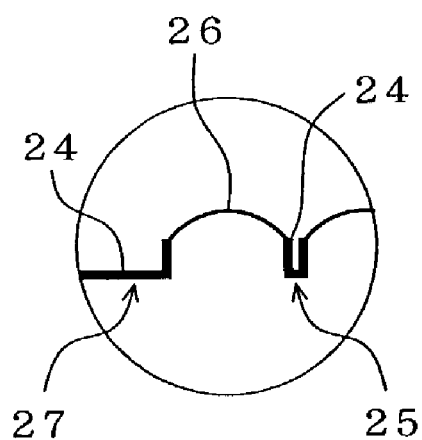
F I G. 5 B
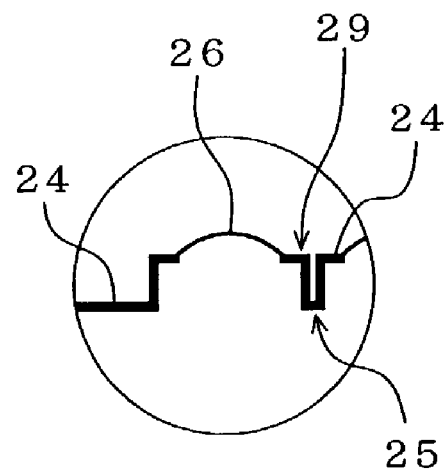
F I G. 5 C

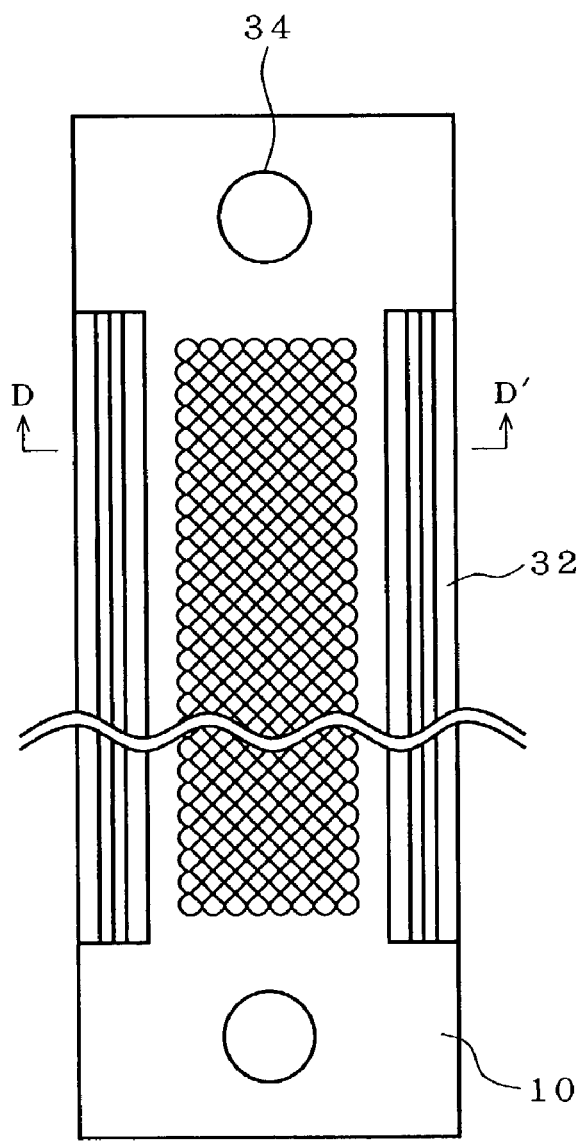
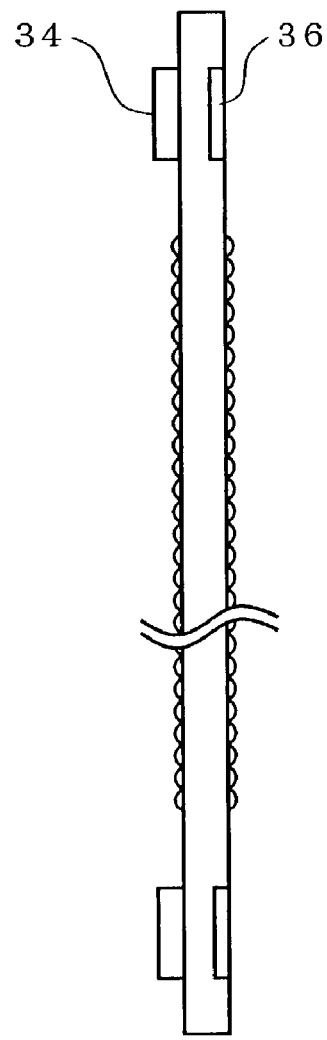
F I G. 8 A
F I G. 8 B
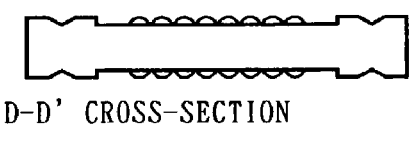
D-D' CROSS-SECTION
F I G. 8 C

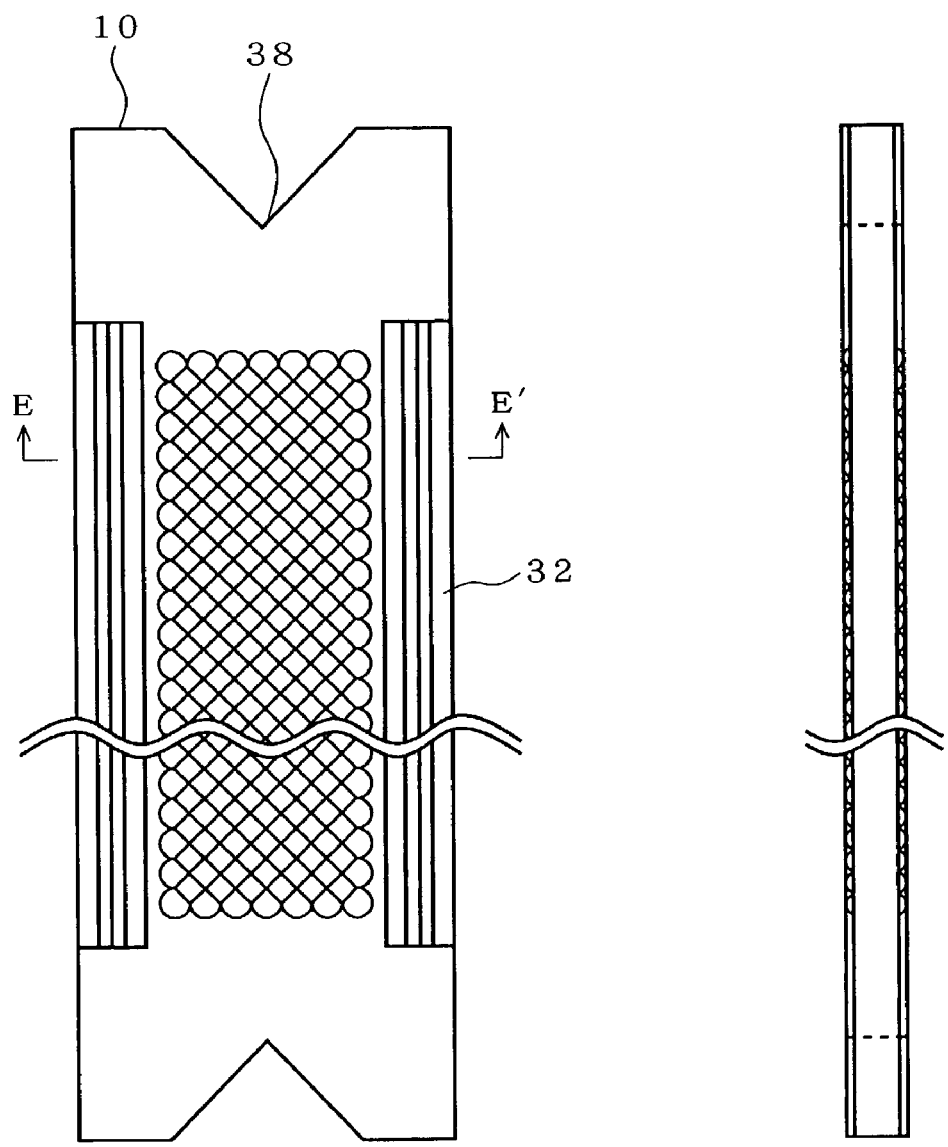
FIG. 9A
FIG. 9B
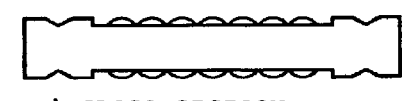
E-E' CROSS-SECTION
FIG. 9C

LASER BEAM

DEPTH OF GROOVE

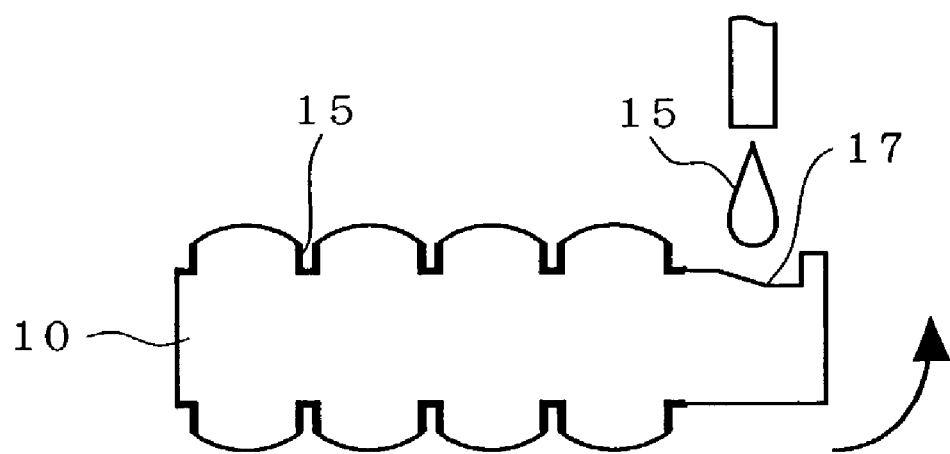
F I G . 1 3
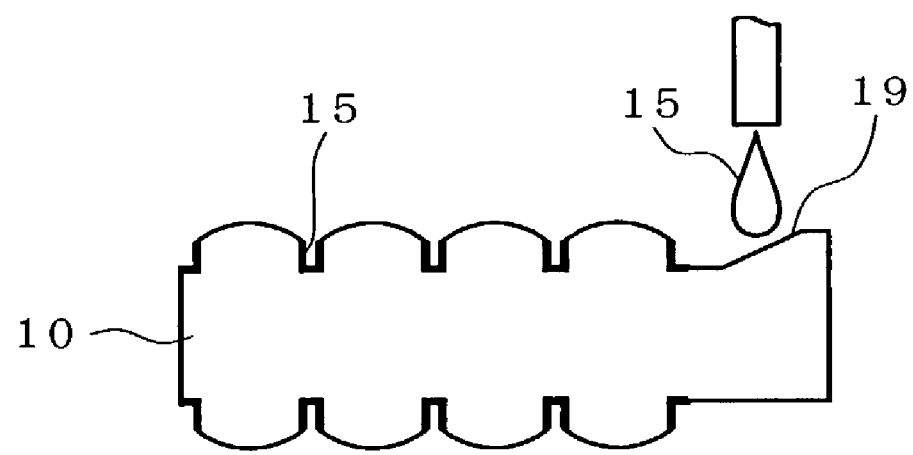
F I G . 1 4

F I G. 1 5 A
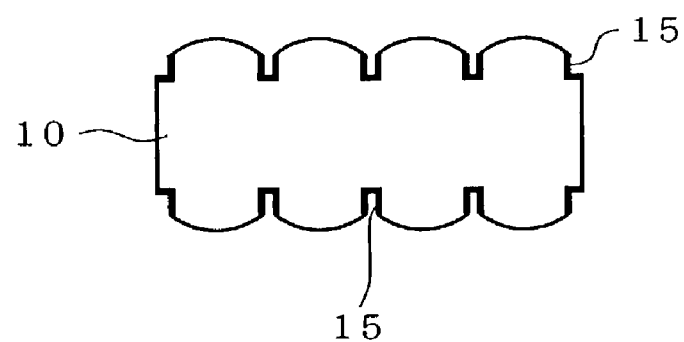
F I G. 1 5 B
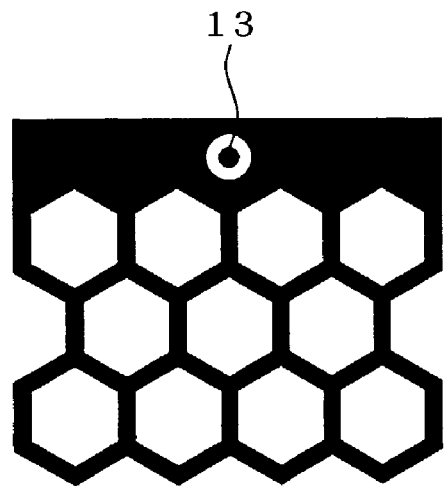

RESIN LENS PLATES COMBINED TO BE SIMILARLY ORIENTED
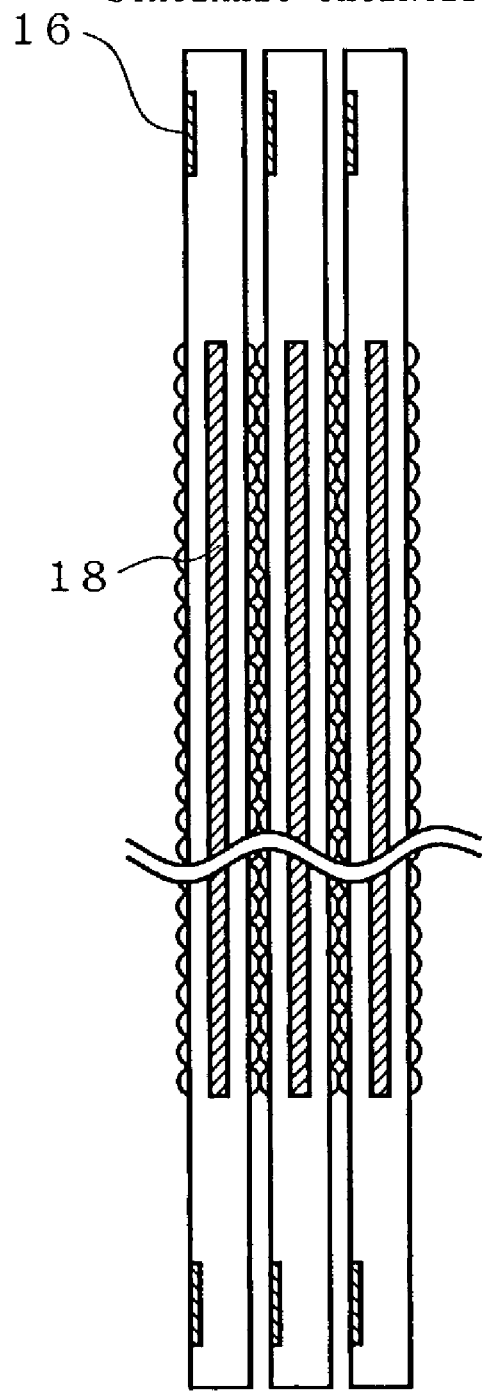
F I G . 1 6

F I G. 1 7 A
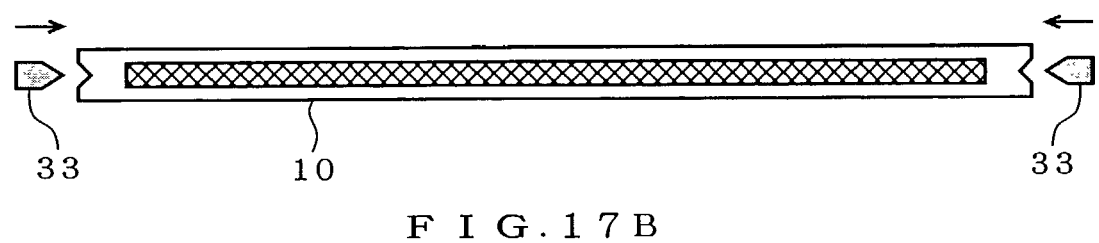
F I G. 1 7 B
F I G. 1 8 A
F I G. 1 8 B

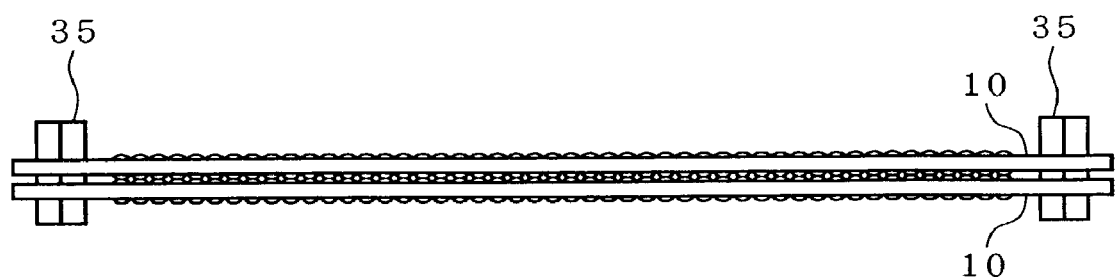
F I G. 1 9 A
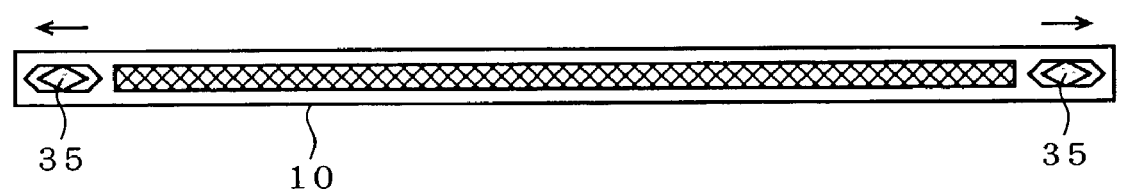
F I G. 1 9 B
F I G. 2 0 A
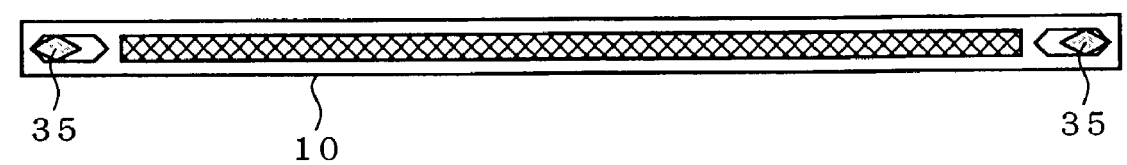
F I G. 2 0 B

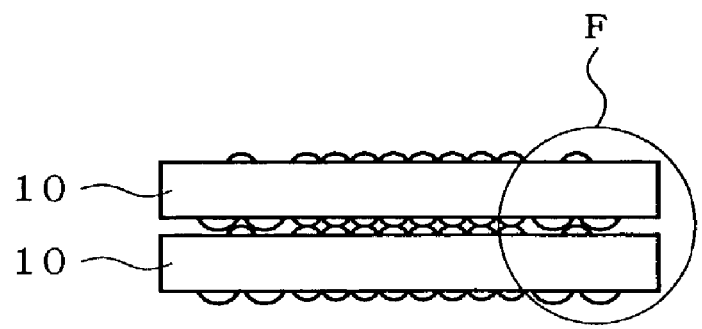
F I G. 2 1 A
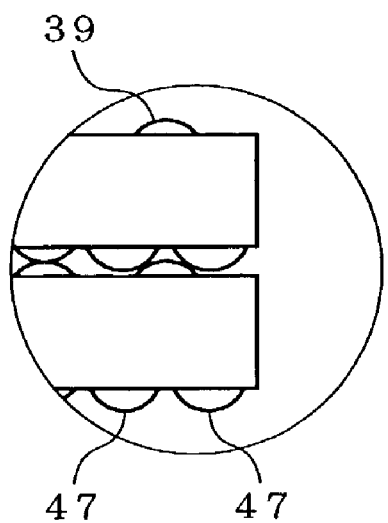
F I G. 2 1 B

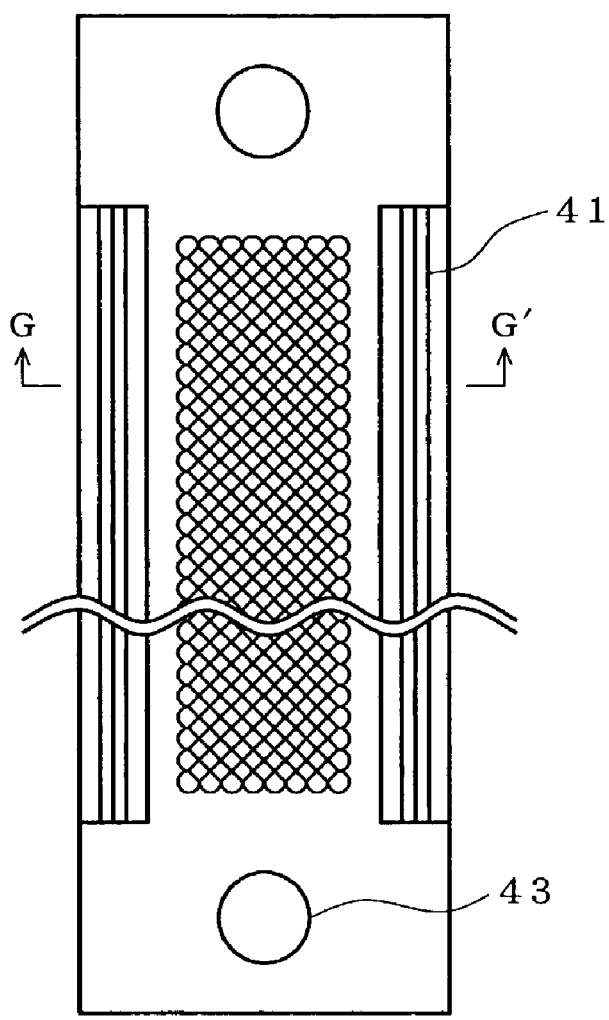
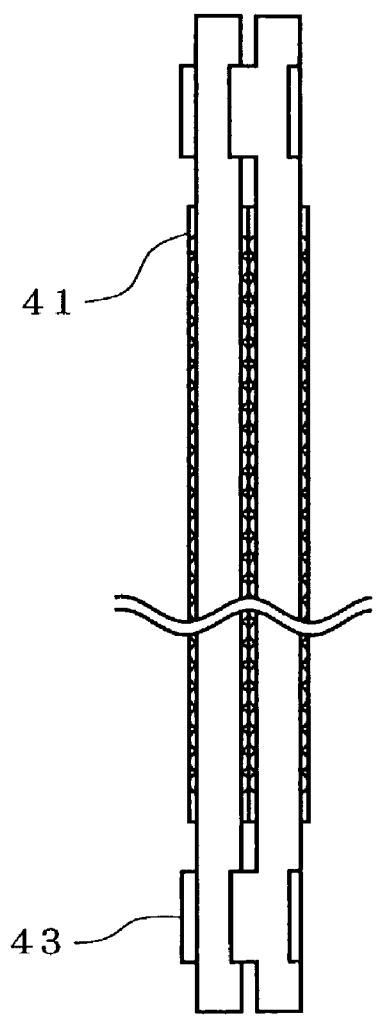
FIG. 22A  FIG. 22B
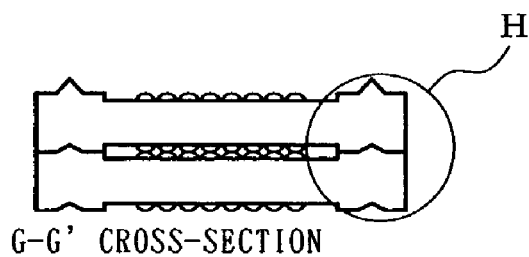
FIG. 22C

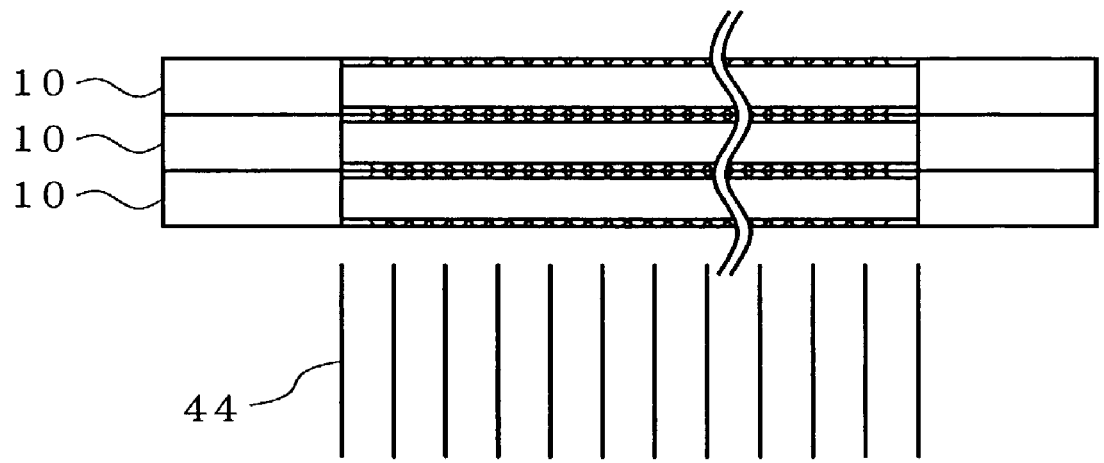
F I G. 2 4 A
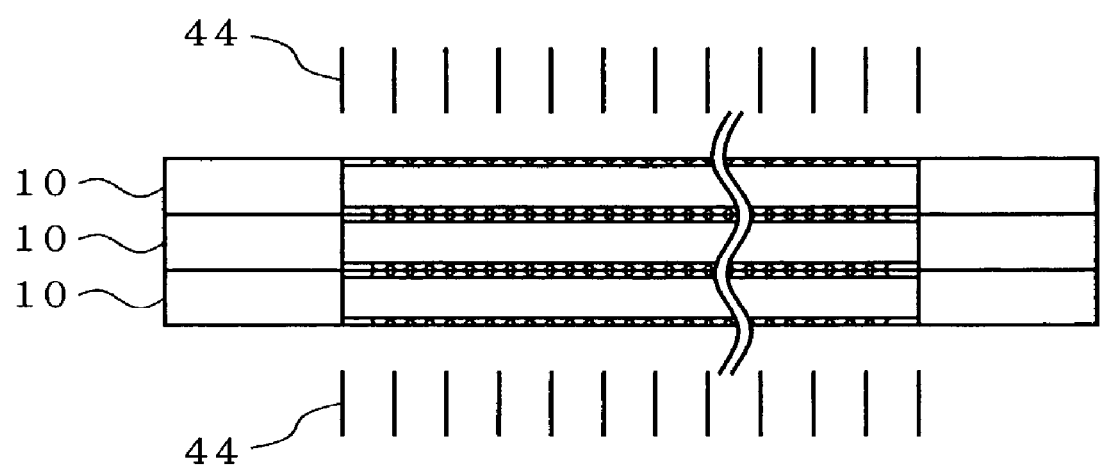
F I G. 2 4 B

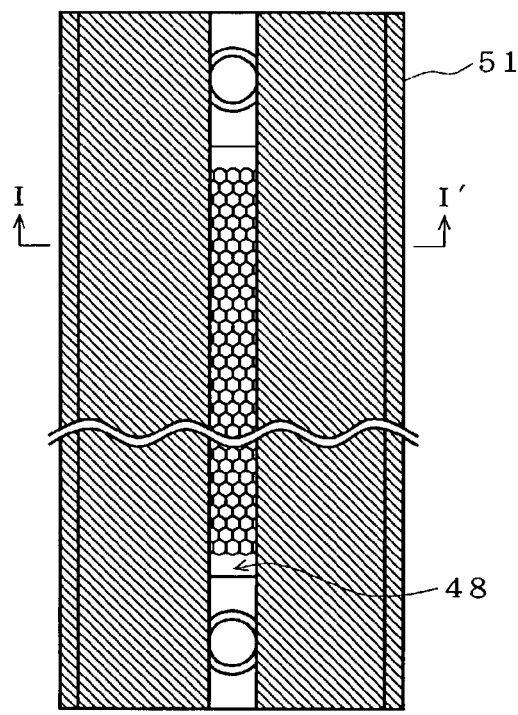
F I G. 2 5 A
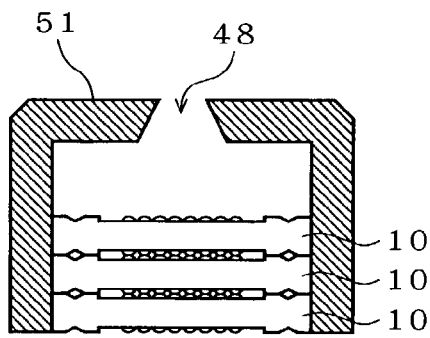
F I G. 2 5 B
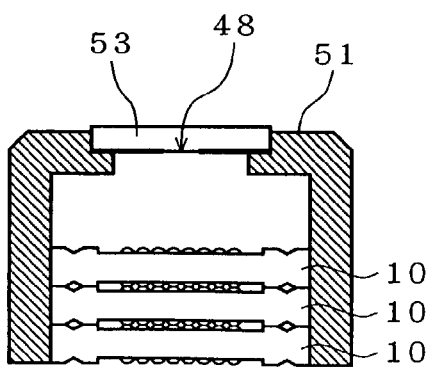
F I G. 2 5 C
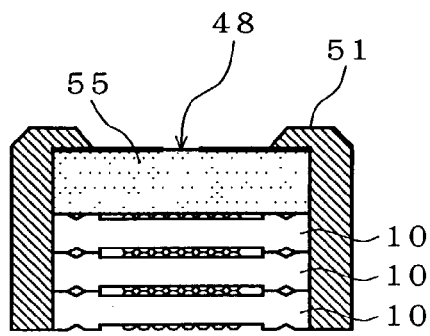
F I G. 2 5 D

ERECT IMAGE RESIN LENS ARRAY AND THE MANUFACTURE THEREOF

FIELD OF THE INVENTION

The present invention relates to an erect image resin lens array, particularly to an erect image resin lens array obtained by arranging convex lenslets each having a spherical or aspherical end surface in a regular pattern on a planar plate with adjacent lenslets being apart from each other by a specified pitch to produce a resin lens plate, and by stacking at least two such resin lens plates such that their lenslet carrying surfaces face each other. The present invention further relates to a method for manufacturing the erect image resin lens array.

BACKGROUND OF THE INVENTION

The conventional image forming optical system used as an image transmission unit for optical writing systems such as photo-printers, or for optical reading systems such as scanners often incorporates a rod lens array comprising rod lenslets each having a different refractive index. The erect image optical system incorporating such a lens array can be very compact in size. However, for the manufacture of such a lens array, it is necessary to arrange a large number of rod lenslets in a regular pattern, and to fix them using a resin. Thus, regular arrangement of the rod lenslets is often disturbed, that is, an uneven arrangement of the lenslets may occur. Such an uneven arrangement of the lenslets would affect the resolving power of the lens array and, if such a lens array is incorporated in a high-resolution image forming system (having, for example, a resolution as high as 1200 dpi) as is available on the recent market, will cause the formation of an uneven image.

To avoid the occurrence of such uneven arrangement of lenslets, a proposal to substitute the rod lens array for an erect image resin lens array was presented. The erect image resin lens array is an erect image optical system obtained by arranging a large number of lenslets on a transparent planar substrate, to produce thereby a resin lens plate, and by stacking two or more such resin lens plates one over another to give a layered assembly (lens array). Because fabrication of the resin lens plate is based on the injection of a resin into a die, the precision with which lenslets are arranged as designed is very high, and fabrication of large-sized resin lens plates is comparatively easy. Moreover, it is also possible to arrange lenslets so densely as to eliminate gap, which might otherwise exist between adjacent lenslets, which will contribute to the construction of an erect image lens array capable of transmitting incident light highly efficiently.

However, because fabrication of the aforementioned resin lens plate usually must include arranging lenslets on a transparent planar substrate, out of rays incident to a given lenslet, a certain fraction, distinct from the remaining fraction which is responsible for the formation of an image, passes through the lens body to enter adjacent lenslets to become stray light there. To prevent the occurrence of stray light, a number of countermeasures have been developed: a light-shielding strip is applied along the peripheries of each lenslet excepting its lens portion in contact with the substrate, or, when plural resin lens plates are stacked to give a layered assembly (lens array), shielding septa are introduced between adjacent resin plates at appropriate positions. However, because stray light includes a component passing through the lens body itself, shielding all the other parts than the lens body of each lenslet is not yet sufficient for completely eliminating the stray light component out of the light incident to the lenslet. As far as the lens array is concerned, if a given stack of lenses are shielded with inter-layer septa as well as with individual periphery covering films, the entry of rays other than those incident nearly perpendicularly to the surface of the lens stack will be nearly completely rejected. However, addition of such a structural element as septa to the lens array will increase the overall volume of the array itself, which will be undesirable in many applications.

To date, the erect image resin lens array has been used, in combination with a liquid crystal element, for projecting an image reproduced on a liquid crystal display into a space or on the surface of an object. For said array to be successfully applied for a photo-printer or a scanner, it is necessary to improve the light transmission of each stack of lenslets as well as the resolution of the array. In addition, if the lens array serves as an optical system to receive so-called scanning traces, it must have an elongated form.

SUMMARY OF THE INVENTION

An object of the present invention is to provide an erect image resin lens array, which can effectively eliminate stray light, and is suitably applied to an image transmission system for optical writing or reading.

Another object of the present invention is to provide a resin lens plate, which is suitably used for fabricating such an erect image resin lens array as above.

A still further object of the present invention is to provide an image transmission system incorporating said erect image resin lens array that is free from the aforementioned problems.

A resin lens plate representing a first embodiment of this invention is an oblong plate which has, at the central part(s) of one or both of its surfaces, an area(s) where convex lenslets each having a spherical or aspherical end surface and a rectangular or hexagonal contour in a plan view of the plate are arranged in a regular pattern such that adjacent lenslets are apart from each other by a specified center-to-center pitch, and lensless margins around the central lenslet area, characterized by that the lenslets are arranged such that the direction in which the center-to-center distance between adjacent lenslets takes a maximum value is in parallel with the lengthwise side of the plate. On the resin lens plate, for any given pair of adjacent lenslets, a line is drawn so as to equally divide the center-to-center line, and along this bisector there is provided a groove or a ridge. A light absorbing film is preferably formed over each groove or ridge.

An erect image resin lens array representing a second embodiment of this invention is obtained by stacking two or more aforementioned resin lens plates one over another.

An image transmission system for optical writing or reading representing a third embodiment of this invention is obtained by placing the aforementioned erect image resin lens array in a housing which has a thin slit extending in parallel with the principal scanning direction and having a width equal to or less than that of the central lenslet area in the subordinate scanning direction.

A method for manufacturing a die representing a fourth embodiment of this invention used for fabricating by injection molding a lens plate having convex lenslets each having a spherical or aspherical end surface arranged in a regular pattern on its surface comprising the steps of: obtaining a mother matrix by arranging spherically convex resin lenslets in a regular pattern on a planar substrate, and processing, for each spherically convex lenslet of the mother matrix, the periphery of a circle which has the center essentially corresponding with the center of the lenslet; forming a conductive film over the resin of the mother matrix thus processed; plating a metal to form a metal plating having a specified thickness on the conductive film; and obtaining a die by parting the metal plating from the mother matrix.

A method for manufacturing a resin lens plate representing a fifth embodiment of this invention comprises the steps of preparing two dies manufactured by the above method, combining the dies such that the concavities thereon face each other, and mounting the dies to respective die-sets; introducing a gap having a specified width between the two apposed dies, and injecting a resin through the gap; parting the two dies and removing a resin lens plate; and forming a light absorbing film over a groove or a ridge formed between each pair of adjacent convex lenslets on the resin lens plate.

A method for fabricating an erect image resin lens array representing a sixth embodiment of this invention comprises stacking two or more resin lens plates which contain at least one resin lens plate prepared by the aforementioned method.

BRIEF DESCRIPTION OF THE DRAWINGS

FIG. 1A is a plan view of a resin lens plate constituting an erect image resin lens array of the present invention.

FIG. 1B is a lateral view of the resin lens plate.

FIG. 2A is a diagram for illustrating the arrangement of convex lenslets.

FIG. 2B is another diagram for illustrating the arrangement of convex lenslets.

FIG. 3A is a diagram for illustrating a preferred arrangement of convex lenslets.

FIG. 3B is a diagram for illustrating another preferred arrangement of convex lenslets.

FIG. 5A is a sectional view of part of the resin lens plate cut along the line A–A' of FIG. 4A.

FIG. 5B is a sectional view of part of the resin lens plate cut along the line B–B' of FIG. 4B.

FIG. 5C is a sectional view of part of the resin lens plate cut along the line C–C' of FIG. 4C.

FIG. 8A is a plan view of another example of the resin lens plate.

FIG. 8B is a lateral view of the above resin lens plate.

FIG. 8C is a sectional view of the resin lens plate cut along the line D–D' of FIG. 8A.

FIG. 9A is a plan view of a still other example of the resin lens plate.

FIG. 9B is a lateral view of the above resin lens plate.

FIG. 9C is a sectional view of the resin lens plate cut along the line E–E' of FIG. 9A.

FIG. 13 illustrates an exemplary method for forming a light absorbing film over each groove.

FIG. 14 illustrates another exemplary method for forming a light absorbing film over each groove.

FIG. 15A is a sectional view of part of a resin lens plate.

FIG. 15B illustrate part of a light absorbing film formed over a resin lens plate by the method as depicted in FIG. 13 or 14.

FIG. 16 is a lateral view of an erect image resin lens array obtained by stacking three resin lens plates.

FIG. 17A is a lateral view of two resin lens plates which are placed with respect to each other for proper alignment before they are stacked.

FIG. 17B is a plan view of resin lens plates before they are aligned with each other.

FIG. 18A is a lateral view of two resin lens plates which are placed with respect to each other for proper alignment before they are stacked.

FIG. 18B is a plan view of resin lens plates after they have been aligned with each other.

FIG. 19A is a lateral view of two resin lens plates each having a through-hole at either lengthwise end which will be aligned with respect to each other through the operation of rod-like adjusters inserted into the through-holes.

FIG. 19B is a plan view of the resin lens plates before they are aligned to each other.

FIG. 20A is a lateral view of the two resin lens plates which have been aligned to each other through the operation of the rod-like adjusters inserted into the through-holes formed on both lengthwise ends of the two lens plates.

FIG. 20B is a plan view of the two resin lens plates after they have been aligned to each other.

FIG. 21A is a sectional view of another pair of resin lens plates which align with respect to each other in a different manner from the one observed in the foregoing example.

FIG. 21B is an enlarged view of the part of FIG. 21A designated as F.

FIG. 22A is a plan view of two resin lens plates bonded via ultrasonic excitation.

FIG. 22B is a lateral view of the two resin lens plates bonded as above with their long end surfaces directed to the view.

FIG. 22C is a sectional view of the two resin lens plates cut along the line G–G' of FIG. 22A.

FIG. 24A is a lateral view of an erect image resin lens array having a septal structure on its surface to receive incident light.

FIG. 24B is a lateral view of an erect image resin lens array having septal structures on both of its surfaces, that is, one to receive incident light and the other from which transmitted light exits.

FIG. 25A is a plan view of an image transmission system comprising an erect image resin lens array placed in a housing.

FIG. 25B is a sectional view of the image transmission system cut along the line of I–I' of FIG. 25A.

FIG. 25C is a sectional view of another example of the image transmission system.

FIG. 25D is a sectional view of a still other example of the image transmission system.

DETAILED DESCRIPTION OF THE PREFERRED EMBODIMENT

Figure 4A:
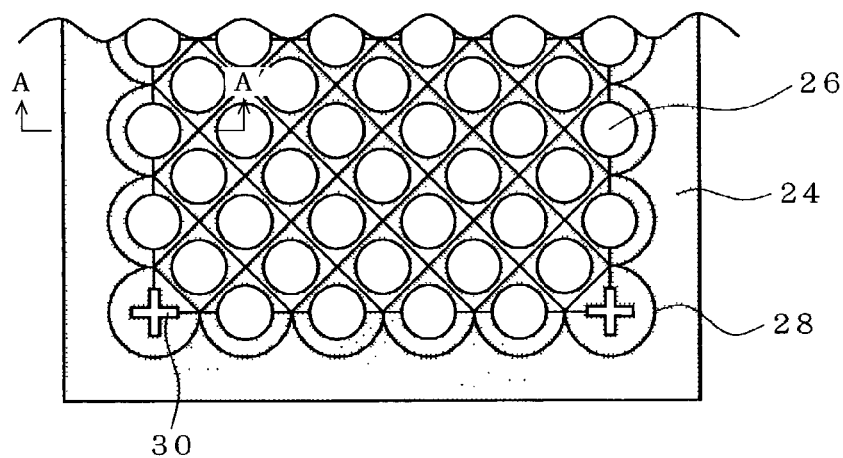
FIG. 4A is a plan view of part of a resin lens plate for illustrating how a light absorbing film is formed thereupon excepting areas on which lenses and their concentric apertures are formed.

The preferred embodiments of the present invention will be described below with reference to the drawings.

The erect image resin lens array of the present invention is obtained by intimately stacking, via bonding, two or more resin lens plates each carrying a matrix of multiple convex lenslets on one or both of its surfaces. Such an erect image resin lens array obtained according to this invention must contain at least three lenslet carrying layers.

FIG. 1A is a plan view of a resin lens plate constituting an erect image resin lens array of this invention; and FIG. 1B is a lateral view of the same resin lens plate. The resin lens plate is prepared by injection molding. The material for the resin lens plate includes any known materials available to injection molding, but what is particularly preferred includes olefin resins, cyclo-olefin resins, and norbornene resins. What is commercially available includes ZEONEX (™) and ZEONOA (™) provided by Japan Zeon Co., and ARTON (™) by JSR Co. All these commercially available materials are low in hygroscopicity.

The resin lens plate 10 prepared by injection molding according to this invention has an elongated rectangular shape with a central area for lenslet formation. On the central area, multiple convex lenslets 12 each having a spherical or aspherical end surface are regularly arranged in columns and rows in parallel with its long and short sides (matrix of lenslets), that is, in columns in the lengthwise direction (direction which would correspond to the main scanning direction if the lens plate is scanned under the influence of an image transmission system) and in rows in the crosswise direction (direction which would correspond to the subordinate scanning direction). The matrix of convex lenslets 12 are arranged on both surfaces of this particular resin lens plate 10.

On the marginal areas surrounding the central lenslet area (marginal lensless areas), there are formed a number of protruding lenslet spacers 14 having a height larger than that of the lenslet which are for keeping constant the interval between two opposite matrices of lenslets when two resin lens plates are stacked so as to make their lenslets face each other. The protruding lenslet spacers 14 are preferably provided on the lengthwise margins of the resin lens plate 10 so as to prevent the lengthwise warping of the resin lens plate 10 which might otherwise result.

On the marginal lensless areas, there are also formed pin impressions 16 which are left by the pins of the injection molding machine. They are the prints of the pins of the injection molding machine which are implemented for facilitating the parting of the mold from the die on completion of molding.

On one lengthwise lateral surface (surface upon which no lenslet is formed) of the resin lens plate 10, there is a gate remain 18. This is the remain of a film gate through which a resin was injected into the die for injection molding. The reason of this is as follows: in the molding of an elongated thin rectangular plate such as the resin lens plate of this embodiment, it is preferred to implement a film gate having a long, thin aperture on one side of the die, and to inject a resin through the gate for molding, because then as the cured resin contracts uniformly, the resulting mold will be subject to less distortions and strains than would be otherwise observed.

On the lengthwise lateral surfaces of the resin lens plate 10 there are also provided undercut portions 20. The undercut portions 20 serve as mortises, when the resin lens plate is placed in a housing, to engage with corresponding tenons of the latter, thereby ensuring the firm attachment of the resin lens plate 10 to the housing. The undercut portions 20 are preferably implemented on the lengthwise sides of the resin lens plate 10 because the plate has an elongated rectangular shape.

The convex lenslets 12 each having a spherical or aspherical end surface are arranged in a manner as indicated in FIGS. 2A and 2B: for a given pair of adjacent lenslet columns or rows which run parallel with the crosswise or lengthwise side of the plate, the two columns or rows of lenslets are arranged with respect to each other such that, when counted from the terminal top lenslet sequentially along the columns or rows, the lenslets of one column or row are followed by those of the other column or row alternately, that is, when the centers of the lenslets are connected sequentially in this process, the resulting pattern will consist of a zigzag line (zigzag pattern). The lenslet may have a rectanglular end surface as shown in FIG. 2A or a hexagonal end surface as shown in FIG. 2B. FIG. 2A shows a plan view of a matrix of quadrangular lenslets densely packed in a four-side contact pattern, while FIG. 2B shows a plan view of another matrix of hexagonal lenslets densely packed in a six-side contact pattern.

The four-side contact pattern characteristic with a matrix of densely packed quadrangular lenslets refers to a pattern in which any given lenslet (except for those residing at the margins of the matrix) comes into direct contact with adjacent lenslets through all of its four sides. The six-side contact pattern characteristic with a matrix of densely packed hexagonal lenslets refers to a pattern in which any given lenslet (except for those residing at the margins of the matrix) comes into direct contact with adjacent lenslets through all of its six sides.

It is not always necessary for the quadrangular lenslet to have a square end surface as in the figure. The end surface of the quadrangular lenslet may take a parallelogram or oblong shape. It is not always necessary for the hexagonal lenslet to have an equilateral hexagonal end surface: the end surface may take any hexagonal shape as long as the opposite sides are parallel to each other. For any given lens matrix, its columns and rows are not always so densely packed as to reject any space between each pair of adjacent columns and rows. However, as far as light transmission is concerned, a matrix of densely packed lenselets is superior to a matrix of loosely packed lenselets.

If such a resin lens plate as described above is used in combination with a linear scanning optical system, the main scan line which is in parallel with the lengthwise direction of the resin lens plate preferably corresponds with a line on which the center-to-center distance of adjacent lenslets takes the maximum value as indicated by FIGS. 3A and 3B.

The reason for this is as follows. Turn to a matrix of densely packed quadrangular lenslets (four-side contact pattern) of FIG. 3A and pay an attention to lenslet 80 for illustration. A bundle of rays 81 (image forming rays) entering the center of lenslet 80 is responsible for the formation of an image assigned to lenslet 80. The most important source supplying stray light to lenslet 80 is the image forming rays 83 of the four adjacent lenslets 82 in contact with lenslet 80. Thus, lenslets are preferably arranged such that, when a line is drawn as indicated by the arrow of the figure, the center-to-center distance of adjacent lenslets on the line becomes the largest, that is, the line corresponds with the diagonal line of the lenslets, and the main scan line corresponds with the above line. Because then the interfering effect of stray light from adjacent lenslets on the image forming rays 81 can be minimized.

The similar consideration is valid for a matrix of densely packed hexagonal lenslets (six-side contact pattern) of FIG. 3B. Pay an attention to lenslet 90 which receives a bundle of image forming rays 91. The most important source supplying stray light to lenslet 90 is the image forming rays 93 of the six adjacent lenslets 92 in contact with lenslet 90. It is preferred as in the above case to arrange lenslets such that, when a line is drawn as indicated by the arrow of the figure, the center-to-center distance of adjacent lenslets on the line becomes the largest, and the main scan line corresponds with the above line. Because then the interfering effect of stray light on the image forming rays 91 can be minimized.

With a matrix of densely packed quadrangular lenslets (four-side contact pattern), a given lenslet is less affected with stray light than a corresponding lenslet of a matrix of densely packed hexagonal lenslets (six-side contact pattern), because in the former matrix the distance of the scan line from the source of stray light is made larger than is permissible with the latter matrix. As indicated above with respect to FIGS. 2A and 2B, quadrangular lenslets arranged in a four-side contact pattern and hexagonal lenslets arranged in a six-side contact pattern are usually densely packed. If the lenslets are densely packed, they will take a strictly square or equilateral hexagonal shape. A matrix of densely packed square lenslets is superior to a matrix of densely packed equilateral hexagonal lenslets because of its comparatively free from the adverse effect from stray light as indicated above. However, the latter is more advantageous than the former in that an equilateral hexagonal lenslet undergoes less astigmatism at its margins, and more efficiently transmit light than a square lenslet.

The molded resin lens plate 10 shown in FIGS. 1A and 1B has a reflection-lowering film coated on its surface. The reflection-lowering film is to lower the reflection of the resin lens plate, and is made from a fluorine-based resin.

The resin lens plate may receive an additional coat of a transparent conductive film on its surface. If a transparent conductive film is coated on the surface of the resin lens plate such that the potential level of the transparent conductive film can be adjusted, it will be possible to protect the resin lens plate against adverse effects from foreign objects such as toner particles which would otherwise adhere particularly to the surface of lenslets. To prevent the adherence of foreign objects to the resin lens plate, it is most preferred to take a following measure. Let's assume, for illustration, the resin lens array is used in combination with a photo-printer which uses a toner in the light exposure/developing process. Then, the potential level of the transparent conductive film should be adjusted to be equal to that of a photo-sensitive body of the photo-printer which receives toner particles on its surface in the light exposure/developing process. If the transparent conductive film is made from ITO (indium/tin oxide film), the film is further provided with a hydrophilic property. Such a hydrophilic film improves the wettability of the resin lens plate, which will be advantageous if the resin lens plate must be bonded via an adhesive agent to another resin lens plate.

On the top of the reflection-lowering film of the resin lens plate, a network comprising light absorbing strips (light shielding strips) may be formed to cover the entire boundaries of adjacent lenslets, thereby intercepting, for a given lenslet, the entry of stray light from adjacent lenslets.

Figure 4B:
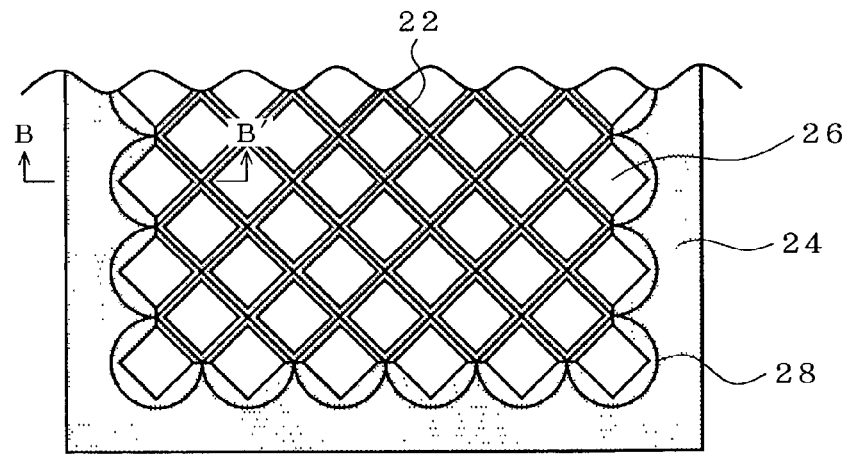
FIG. 4B is a plan view of part of another resin lens plate for illustrating how a light absorbing film is formed along a bisector of the center-to-center line between each pair of adjacent lenslets.
Figure 4C:
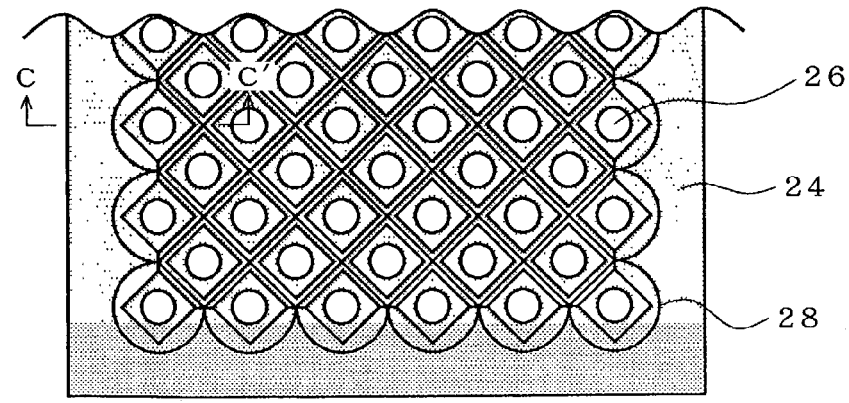
FIG. 4C is a plan view of part of a still other resin lens plate for illustrating how a light absorbing film is formed over a space between each pair of adjacent lenslets that has no lens function.

FIG. 4A is a plan view of part of a resin lens plate carrying a matrix of densely packed quadrangular lenslets where a light absorbing film 24 is formed on the entire surface of the plate excepting an annular aperture 26 concentrically formed around the center of each lenslet. FIG. 4B is a plan view of part of another resin lens plate carrying a matrix of densely packed quadrangular lenslets where a light absorbing film 24 having a certain width is formed along a bisector 22 of the center-to-center line of each pair of adjacent lenslets. The aperture 26 of each lenslet is defined by the four surrounding light absorbing strips. The light absorbing film 24 consists of a network of the light absorbing strips. FIG. 4C, in FIG. 4B, is a plan view of part of a still other resin lens plate carrying a matrix of quadrangular lenslets where each light absorbing film covers the margins of adjacent lenses as well as the boundary between them.

For a resin lens plate carrying a matrix of lenslets as shown in FIG. 4B or 4C, it is preferable to form a groove or ridge along each bisector 22, and then to form a light absorbing film 24 over the groove or the ridge. If a light absorbing film 24 is formed over a groove or ridge prepared along each bisector 22, septa to intercept the entry of stray light from adjacent lenslets are implemented on the slopes on both sides of each bisector 22 instead of one as is observed in a resin lens plate carrying a matrix of lenslets as shown in FIG. 4A where a light absorbing film 24 is flatly applied onto each boundary of adjacent lenslets except onto the area of lens and the concentric aperture 26. Thus, with the resin lens plate as shown in FIG. 4B or 4C, the entry of stray light from adjacent lenslets to a given lenslet is more effectively prevented than is possible with the resin lens plate as shown in FIG. 4A, although the margins of the adjacent lenslets are also covered by the light absorbing film in the latter.

FIG. 5A is a sectional view of part of the resin lens plate cut along the line A–A' of FIG. 4A. As shown in the figure, a light absorbing film 24 is formed on the lensless margin and on the boundary with an adjacent lenslet but not on the aperture 26 of the lenslet. FIG. 5B a sectional view of part of the resin lens plate cut along the line B–B' of FIG. 4B. At the center of each boundary of adjacent lenslets there is provided a groove 25, and a light absorbing film 24 is formed thereupon. It is preferable to make the level of the lensless margin 27 as low as that of the base of the groove 25. The light absorbing film 24 is also formed on the lowered surface of the lensless margin 27. FIG. 5C is a sectional view of part of the resin lens plate cut along the line C–C' of FIG. 4C. As shown in the figure, in this embodiment, a light absorbing film 24 is applied not only over each groove 25, but also on the flat margins 29 around each lenslet to shield them against light.

It is possible to partly reject the entry of rays incident obliquely to the optical axis of a given lenslet by applying light absorbing films 24 over all the grooves 25 around it as well as onto the lowered lensless margin 27.

Figure 6A:
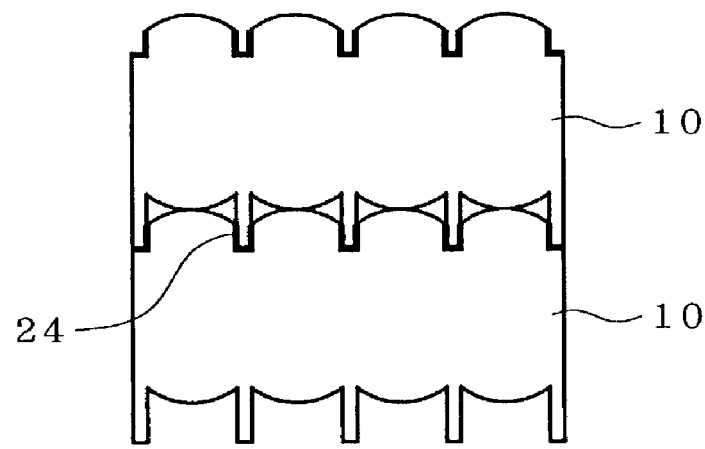
FIG. 6A is a sectional view of part of a lens plate assembly (lens array) obtained by stacking two lens plates each having a groove between each pair of adjacent lenslets on one surface and a ridge between each pair of adjacent lenslets on the other surface such that the ridges of one lens plate engage with the corresponding grooves of the other lens plate.
Figure 6B:
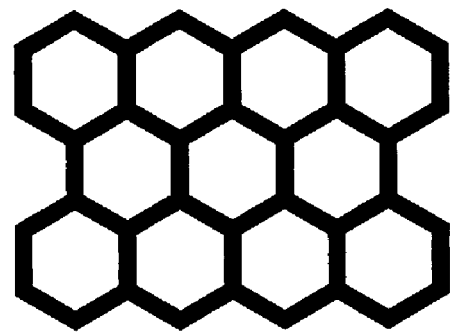
FIG. 6B is a plan view of part of grooves formed on one surface of the resin lens plate.
Figure 6C:
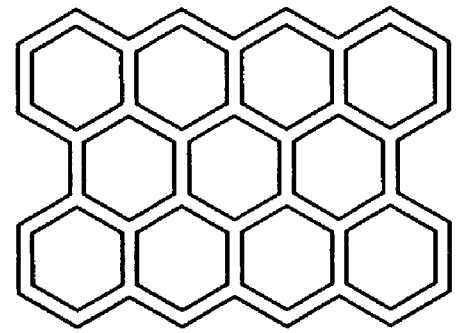
FIG. 6C is a plan view of part of ridges formed on the other surface of the same resin lens plate.

FIG. 6A is a sectional view of part of a lens plate assembly obtained by stacking two lens plates each having a groove along a bisector of the center-to-center line of each pair of adjacent lenslets on one surface and a ridge along a bisector of the center-to-center line of each pair of adjacent lenslets on the other surface such that the ridges of one lens plate engage with the corresponding grooves of the other lens plate. FIG. 6B is a plan view of part of grooves formed on one surface of the resin lens plate. FIG. 6C is a plan view of part of ridges formed on the other surface of the resin lens plate. The groove and the ridge can mesh with each other, and the groove is covered with a light absorbing film 24. If two lens plates are configured as above, that is, each of the two lens plates has a groove between each pair of adjacent lenslets on one surface and a ridge between each pair of adjacent lenslets on the other surface, with the groove to engage with the ridge, and, in forming an erect image resin lens array, the two plates are combined such that each groove of the groove carrying surface of one plate faces corresponding ridge of the ridge carrying surface of the other plate for engagement, it is possible not only to more securely align the lenslets of the two lens plates but also to more thoroughly intercept the entry of stray light than is possible with a corresponding lens plate assembly not dependent on such engagement.

Figure 7A:
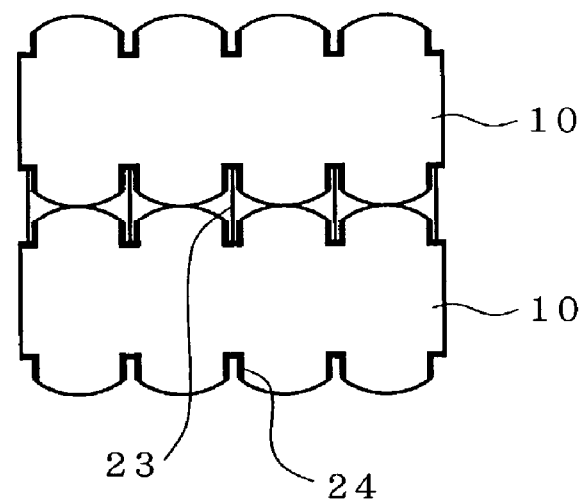
FIG. 7A is a sectional view of part of a lens plate assembly (lens array) comprising two lens plates each having a groove between each pair of adjacent lenslets on both surfaces, for illustrating how the two lens plates are combined.
Figure 7B:
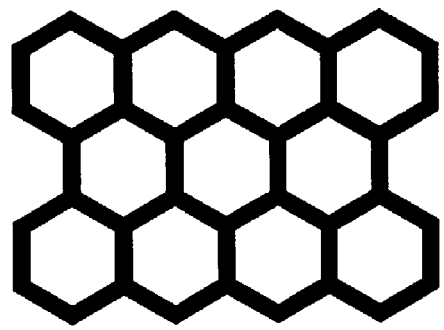
FIG. 7B is a plan view of part of ridges formed on the resin lens plate.

FIG. 7A is a sectional view of part of a lens plate assembly comprising two lens plates each having a groove between each pair of adjacent lenslets on both surfaces, for illustrating how the two lens plates are combined. FIG. 7B is a plan view of part of ridges formed on the resin lens plate. The resin lens plate 10 has a groove along a bisector of the center-to-center line of each pair of adjacent lenslets on both surfaces, and a light absorbing film 24 is formed over each groove. If two resin lens plates 10 configured as above are combined to form an erect image resin lens array, it will be possible by inserting a light shielding septum 23 having a height larger than the width of the groove between each pair of opposite grooves not only to more securely align the lenslets of the two lens plates but also to more thoroughly intercept the entry of stray light than is possible with a similar lens plate array lacking the insertion of such light shielding septa.

FIG. 8A is a plan view of another example of the resin lens plate. FIG. 8B is a lateral view of the above resin lens plate. FIG. 8C is a sectional view of the resin lens plate cut along the line B–B' of FIG. 8A. The resin lens plate 10 has projections 34 on both of its lengthwise ends on one surface and depressions 36 on the corresponding ends of the other surface for ensuring proper alignment, in case the two same resin lens plates are stacked together.

The resin lens plate may have several holes or depressions on one surface and projections on the other on its lensless margins, or knots and notches on its side surfaces to ensure proper alignment, in case two or more such resin lens plates are stacked together.

FIG. 9A is a plan view of a still other example of the resin lens plate. FIG. 9B is a lateral view of the same resin lens plate. FIG. 9C is a sectional view of the resin lens plate cut along the line C–C' of FIG. 9A. The resin lens plate has V-shaped notches 38 on both of its lengthwise ends for ensure proper alignment in case two or more such resin lens plates are stacked together.

The resin lens plate shown in FIG. 8A or 9A has, on its lensless margins in parallel with its lengthwise sides, bonding regions 32 which will be helpful when two or more such resin lens plates 10 are stacked together. The bonding region 32 includes a number of parallel ridges and grooves to enlarge the contact area for adhesion.

The resin lens plate shown in FIG. 8A or 9A is devoid of lenslet spacers 14 as depicted in FIG. 1. The resin lens plate may have lenslet spacers on corridors between the central lenslet area and the bonding regions 32.

Next, the method for manufacturing a resin lens plate according to the present invention will be described. Here, for ease of explanation, the method for manufacturing a resin lens plate which carries a matrix of densely packed convex lenslets where a groove is formed along a bisector of the center-to-center line of each pair of adjacent lenslets will be described.

Firstly, the step of preparing a mother matrix required for the fabrication of a die for molding the resin lens plate of this invention will be described.

Figure 10A:
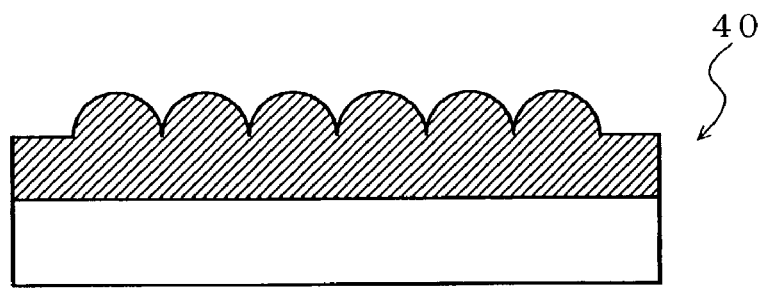
FIG. 10A illustrate a step for preparing a mother matrix required for the manufacture of a metal die for molding the resin lens plate.

[1] Preparation of a Mother Matrix (a) Preparation of a Mother Matrix Carrying a Matrix of Lenslets Each Having a Spherical End Surface (Spherically Convex or Simply Convex Hereinafter) on its Surface A conventional method for preparing a mother matrix having a profile as indicated in FIG. 10A comprising arranging a matrix of convex lenslets each having a desired size and shape on a glass substrate is disclosed in the Japanese Unexamined Patent Publication No. 11-245266. According to this method, a mother matrix is prepared via following steps.

A glass master plate carrying on one surface a matrix of concavities each having a spherical end surface is prepared. A parting agent is applied on the surface and dried. Next, an UV-curing epoxy resin is applied dropwise onto the same surface of the glass master plate. Another glass substrate is placed on the same surface of the glass master plate and pressed to spread thereby the liquid resin applied thereupon. Then, UV-rays are radiated to the surface to harden the liquid resin there. After the resin has been hardened, the glass master plate is removed, to produce a mother matrix comprising a matrix of convex lenslets laid on the glass substrate.

Alternatively, according to the disclosure of the Japanese Unexamined Patent Publication No. 7-218702, a conventional mother matrix can be prepared by a method as described below.

On the surface of a substrate, a thermoplastic resin material layer, an intermediate layer and a photo-resist layer each having a specified thickness are layered. The photo-resist layer carries a photo-resist pattern consisting of a matrix of circles each having a desired diameter. The layered structure is subjected to photolithography so that the parts not covered by the photo-resist pattern can be etched away: the intermediate layer is etched away with the photo-resist layer serving as a mask, and then the thermoplastic resin material layer is etched by reactive ion etching with the surviving intermediate layer as a mask. Then, a substrate carrying a matrix of columns each having a layered structure is obtained. Each column on the substrate is then removed of the intermediate layer and subjected to thermal treatment so that the resin layer may be warped. Then, a matrix of convex masses each having a spherical end surface is formed on the substrate.

(b) Laser Processing

Figure 10B:
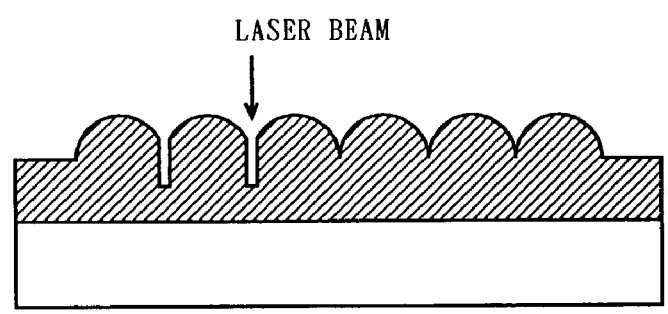
FIG. 10B illustrates another step for preparing a mother matrix required for the manufacture of a metal die for molding the resin lens plate.

Next, as shown in FIG. 10B, a laser beam is scanned along a bisector of the center-to-center line of each pair of adjacent convex lenslets to inscribe a groove along the line. FIG. 10B illustrates a step for preparing a mother matrix comprising densely packed convex lenslets in which adjacent lenslets come in direct contact with each other. To prepare such a matrix of convex lenslets, a laser beam is moved along a trough between each pair of adjacent lenslets. Through this operation, part of resin is eliminated along the trough to form a groove there, and thus a mother matrix 40 of lenslets each having a spherical end surface is obtained in which a groove is inscribed along a trough extending between each pair of adjacent lenslets as shown in FIG. 10C.

The depth of the groove is defined with respect to the depth of the trough of mother matrix 40 observed before laser processing, and is in the range of 0 or more to 100 μm or less. For each groove, the resin layer forming its base may be completely eliminated, or part of the layer may be left. If the groove had a depth below 0 μm, its light shielding ability would be insufficient. On the contrary, if the groove had a depth beyond 100 μm, its molding with a die which will be carried out in the next step would be difficult. The width of the groove, when defined with respect to the pitch P or the center-to-center distance of two adjacent lenslets, should be 0.2 P or less. If the groove had a width beyond 0.2 P, the effective area of each lenslet would be reduced so much that light transmission through it would be insufficient. In the figure, in the profile of each groove, its lateral walls meet its base at right angles. Actually, however, the lateral walls are preferably made slightly tapered towards the base, because then in the subsequent step for injection molding, the mold will be more easily parted from the die than is possible with a similar mold in contact with orthogonal lateral walls. The base of each groove is preferably made rough.

Figure 10C:
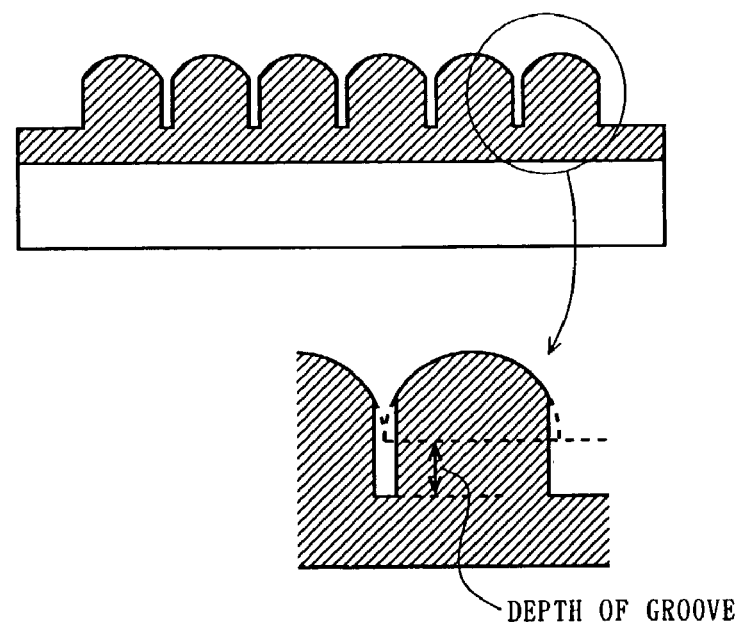
FIG. 10C illustrates a still other step for preparing a mother matrix required for the manufacture of a metal die for molding the resin lens plate.

The laser beam is also applied to the lensless margins surrounding the central lenslet area including the junctions with the central lenslet area as shown in FIG. 10C. The lensless margins are preferably processed such that their level becomes flush with the base of the groove as indicated in the partly enlarged diagram.

In the actual processing, a KrF exima laser (248 nm in wavelength) which has been thought appropriate for processing epoxy resins was used. The processing was carried out under the following condition: output power, 230 mJ; energy density, about 0.5 J/cm$^2$; and frequency, 150 Hz.

Inscription of grooves is achieved by radiating a laser spot beam having a diameter of 40 μm onto a resin lens plate carrying a matrix of densely packed convex lenslets each having a spherical end surface (four-side contact pattern) placed on a work-stage, and by moving the work-stage such that the laser beam can trace the peripheries of each square-shaped lenslet to inscribe grooves along them. The scanning speed of the laser beam was set to 250 μm/s.

In the above processing, excess resin often remains at the intersection of crossing grooves. To meet this situation, it is necessary following the initial processing to conduct a processing anew which consists of removing residual excess resin. In addition, an Ar gas nozzle is placed close to the part of the work irradiated by the laser beam so that gas evolved from irradiated resin can be dispersed by the gas discharged from the nozzle and its adsorption to the work can be prevented.

The processing exima laser may include, in addition to the one based on KrF, those based on ArF (193 nm in wavelength), XcCl (308 nm), XcF (351 nm), etc. The usable laser other than the exima laser may include the third (355 nm in wavelength) and fourth harmonics (266 nm) of an Nd-YAG laser.

The material of the work may include any known materials amenable to processing via a ultra-violet beam such as a KrF exima laser: it may include, in addition to epoxy resins, resins made from polyimide, polyester, polycarbonate, polyurethane, polysulfon, polyethylenetelephthalate (PET), etc.

Inscription of grooves along the peripheries of each lenslet is achieved by moving the work-stage carrying the work such that a spot-like laser beam as described above can trace the pattern as designed, or by appropriately combining the scanning of the beam with the movement of the stage. The laser processing may be achieved by inserting, at the midway of the course of the laser beam, a mask carrying a slit corresponding with a groove so that a groove having a less width than is defined by the spot size of the beam can be projected on the work. The mask may be made of a multilayered film comprising dielectric materials, or from a metal such as stainless steel or chromium. Alternatively, the laser processing may be achieved by inserting, at the midway of the course of the laser beam, a mask comprising a pattern of a network of inter-lenslet bisectors covering all or part of the central lenslet area, and by radiating the laser beam through the mask to the entire central lenslet area or to its part covered with the mask, thereby forming grooves around each lenslet at one laser processing or after several divided laser processings.

With respect to a matrix of densely packed convex lenslets each having a square contour arranged in a zigzag pattern, it is comparatively easy to inscribe grooves throughout the matrix, because a bisector of the center-to-center line of a given pair of adjacent lenslets (inter-lenslet bisector) linearly meets a next inter-lenslet bisector, and thus the inter-lenslet bisectors, when connected together throughout the matrix, can be reduced to two groups of parallel lines which cross each other at right angles. With respect to a matrix of densely packed convex lenslets each having a hexagonal contour arranged in a zigzag pattern, it is comparatively difficult to inscribe grooves throughout the matrix, because a given inter-lenslet bisector does not linearly meet but meets with an angle a next inter-lenslet bisector, which will somewhat complicate the laser scanning for forming grooves along the inter-lenslet bisectors.

For a given matrix of lenslets, even if its column-to-column distance is different from the row-to-row distance, a groove should be inscribed along each inter-lenslet bisector. In this case, however, the bisector does not meet the center-to-center line at right angles. The laser processing for forming the grooves may proceed in the same manner as described above.

Forming of the grooves may be also achieved by reactive ionic etching, ion beam etching, sand blasting, machining, etc.

Next, a step of preparing an Ni (nickel) die using the mother matrix 40 prepared as above will be described.

[2] Fabrication of an Ni Die (a) Formation of a Conductive Film

Figure 11A:
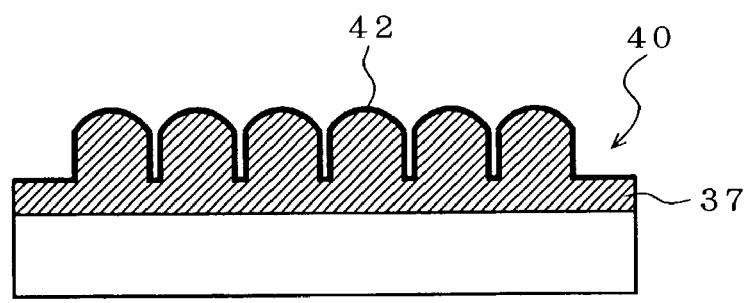
FIG. 11A illustrates a step for preparing an Ni die using the mother matrix.

As shown in FIG. 11A, a conductive film 42 is formed on the resin surface 37 of the mother matrix 40. Formation of the conductive film 42 is achieved, for example, by Ni-electroless plating.

(b) Fabrication of Ni Die

Figure 11B:
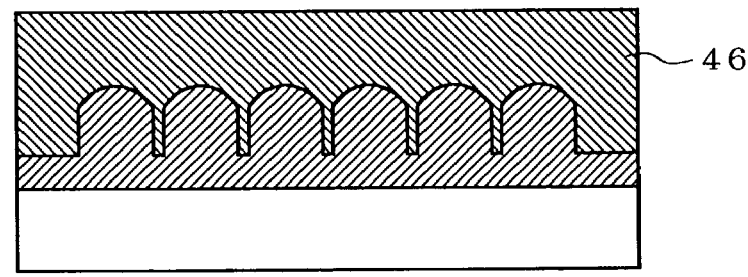
FIG. 11B illustrates another step for preparing an Ni die using the mother matrix.
Figure 11C:
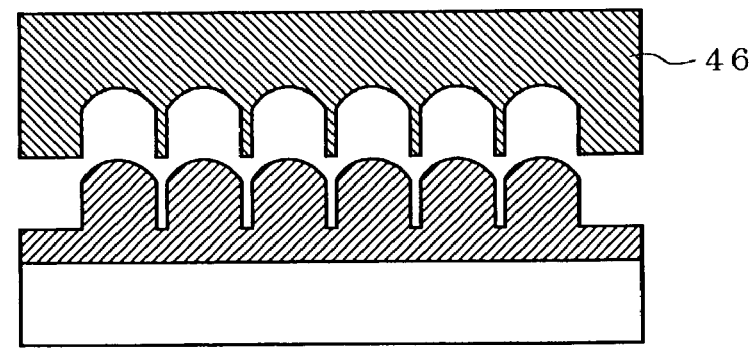
FIG. 11C illustrates a still other step for preparing an Ni die using the mother matrix.

Next, Ni is electro-plated on the conductive film 42 as shown in FIG. 11B. Electro-plating is performed as follows. Namely, an electro-plating tank filled with an electrolyte solution (Ni-electrodeposition solution) is heated with a heater to an appropriate temperature and kept there. Then, an Ni pellet (to be plated) is connected to an anode while a mother matrix 40 whose surface is to be plated is connected a cathode. When current is allowed to pass the circuit, Ni on the anode side dissolves in the solution and deposits on the cathode side. As a result, an Ni plating 46 is formed over the conductive film 42 of the mother matrix. Ni also deposits over the grooves. The Ni plating should have a thickness of 0.3 mm or more so as to maintain the sufficient rigidity required for a die used for injection molding.

(c) Parting and Processing of Lensless Margins

Next, the Ni plating 46 is parted from the mother matrix as shown in FIG. 1C. The Ni plating thus parted has ridges at positions where the grooves of the mother matrix reside. This serves as a die for injection molding. This is subjected, before it is mounted to a die-set, to a marginal processing including beveling of the edges and corners.

In the above embodiment, a mother matrix is prepared from a glass master plate; and an Ni die from the mother matrix. The reason why the Ni die is used for molding instead of the glass master plate is ascribed to the fact that the former permits repeated molding, in contrast with the latter. However, provided that the mass-production of resin lens plates is not required, it is also possible to use the glass master plate as a die for molding a resin lens plate, and then to form a groove along each inter-lenslet bisector using a laser beam.

Next, a step for fabricating a resin lens plate using the die for injection molding prepared as above.

[3] Injection Molding (a) Mounting of the Dies

Figure 12A:
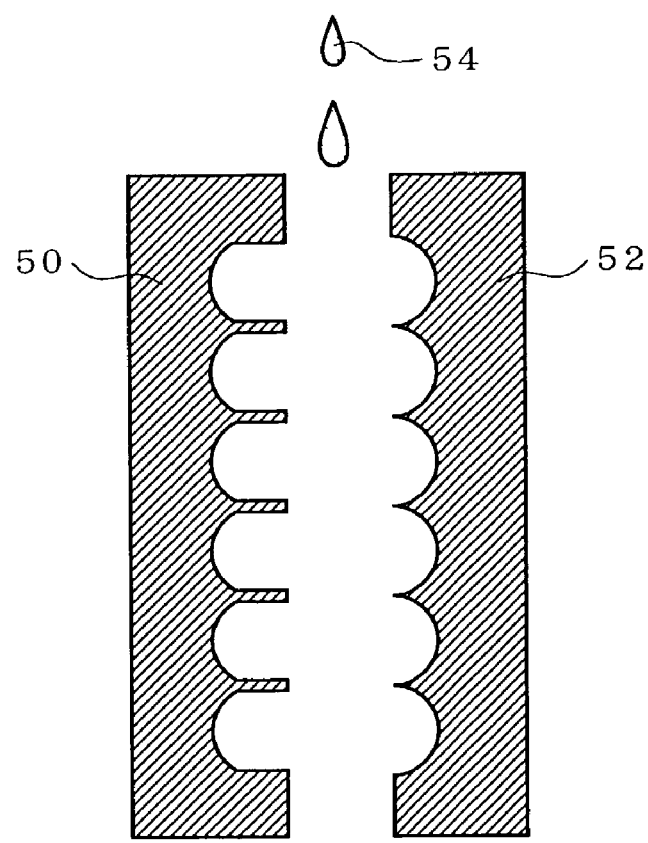
FIG. 12A illustrates a step for preparing a resin lens plate using an injection molding die.

Two Ni dies are mounted to respective die-sets (not illustrated) such that their ridge or saw-tooth carrying surfaces face each other as shown in FIG. 12A. One die 50 is immovably mounted while the other die 52 is movably mounted. Out of two dies 50, 52, one is chosen from Ni dies having a serial ridge profile prepared via the steps as described above, while the other from conventional dies having a saw-tooth profile. However, the two dies may be chosen from dies having a serial ridge profile as needed. In any case, the alignment error between the two dies is ±50 μm. The gap between the two dies should fall within its designed value ±50 μm. The die 52 movably mounted to the die-set is adjusted in position such that a lens plate in which errors, if any, will not exceed the above limits will be obtained.

(b) Injection Molding

A transparent resin 54 is injected into the gap between the two dies 50, 52 thus mounted for molding. The molding resin may include any known resins available to injection molding.

Figure 12B:
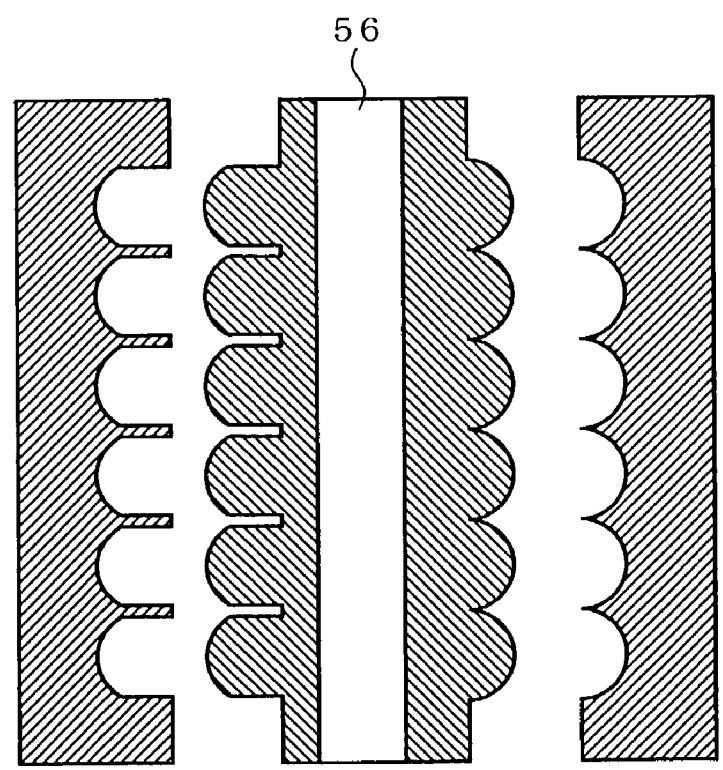
FIG. 12B illustrates another step for preparing a resin lens plate using an injection molding die.

On completion of the injection of the resin, the dies are parted as shown in FIG. 12B, and a resin lens plate 56 is removed.

By repeating this steps, it is possible to mass-produce resin lens plates each of which carries a matrix of densely packed convex lenslets arranged in a four-side contact pattern with a groove formed along each inter-lenslet bisector on one surface.

Lastly, a light absorbing film is formed over each groove inscribed along the inter-lenslet bisector.

In the above embodiment, the resin lens plate carrying matrices of convex lenslets on both surfaces are prepared by injection molding. If it is required to prepare a resin lens plate carrying a matrix of convex lenslets on one of its surfaces, one of the above dies having spherical concavities is exchanged for a die having a flat surface. Such a die may include an Ni plate.

Next, the process how to form a light absorbing film over a groove inscribed along the inter-lenslet bisector will be described.

FIG. 13 illustrates an exemplary method for forming a light absorbing film over each groove. The resin lens plate 10 has an ink reservoir 17 having a base deeper than the base of the groove and running in parallel with its lengthwise side. Black ink 15 is dropwise transferred into the ink reservoir. Then, the adjacent lengthwise side of the resin lens plate 10 is raised so that the crosswise side is tilted to cause black ink 15 to flow down. The black ink 15 introduced into each groove via capillary action is dried to serve as a light absorbing film.

FIG. 14 illustrates another exemplary method for forming a light absorbing film over each groove. The resin lens plate 10 has a barrier 19 running on the lensless margin in parallel with its lengthwise side, and ink is dropwise transferred into a ditch defined by the barrier.

FIG. 15A is a sectional view of part of a resin lens plate. FIG. 15B illustrate part of a light absorbing film formed over a resin lens plate by the method as depicted in FIG. 13 or 14. In FIG. 15B, an ink inlet is indicated by a number 13.

According to the method described above, it is not necessary to resort to the procedures for printing a network of light absorbing strips and for pattern-etching. The surface and the like of the groove may be modified to improve the fluidity of ink. The viscosity of ink and the size of ink particles should be chosen to be the most appropriate for a given purpose.

Formation of a light absorbing film may be achieved by applying a carbon-containing pigment over the entire surface a lens plate, and by wiping, before the pigment is not yet dried, the pigment from the top of each lenslet so as to leave the pigment film only over a network of the grooves.

The light absorbing film is also formed over the lensless margins of the lens plate, or the regions for which, even if light passing through them is present, the light will not have any adverse effect on the rays incident on the lenslets of the central lenslet area. However, the regions that have any risk of developing stray light which may have an adverse effect on the image forming rays is preferably coated as far as possible with the light absorbing film.

The resin lens plate may have alignment crosses 30 (crosses may be substituted for squares) on the corners of its central lenslet area as shown in FIG. 4A, so that proper formation of a network of light absorbing strips over the central lenslet area with respect to each lenslet can be achieved by referring to the alignment crosses. In FIG. 4A, the numeral 28 represents the boundaries of terminal lenslets.

With regard to the lensless margins of the resin lens plate for which light passing through them, if any, will not contribute to the formation of an image, the light absorbing film formed thereupon preferably has a roughened or minutely indented surface so that scattering of the light incident on it can be emphasized.

If the reflection lowering film formed on the resin lens plate is made from a fluorine-based resin, the light absorbing film formed above the reflection lowering film is preferably made from a fluorine-based resin. This is for improving the affinity of the light absorbing film to the reflection lowering film.

The erect image resin lens array according to this invention is obtained by placing two or more resin lens plates prepared as above one over another such that corresponding lenslets of those lens plates can be properly aligned, and then by stacking together those lens plates by bonding.

FIG. 16 is a lateral view of an erect image resin lens array obtained by stacking three resin lens plates.

All the constitutive resin lens plates may be derived from a resin lens plate 10 obtained by applying a light absorbing film along each inter-lenslet bisector in the manner as described above. Or, the above resin lens plate 10 may form one or two constitutive elements of the array. The more the lens plate carrying a lenslet matrix where a light absorbing film is formed along each inter-lenslet bisector is stacked, the less the light passing through the lens plate assembly becomes. However, the less the above lens plates are stacked, the more occurrence of stray light becomes likely. How many resin lens plates carrying a lenslet matrix where a light absorbing film is formed along each inter-lenslet bisector should be stacked may be determined based on the trade-off between the occurrence of stray light and the impaired efficiency of light transmission.

When two lens plates are stacked together, the pin impressions 16 and the film gate remain 18 of the lens plates as shown in FIG. 1 are utilized for properly orienting the lens plates with respect to each other. Specifically, the two lens plates are combined in such a manner as to cause the pin impressions 16 or the film gate remains 18 to face the same direction, which facilitates the two lens plates to be properly oriented with respect to each other before they are combined.

Before two resin lens plates are stacked together, they are subjected to crude alignment. Let's assume for illustration two lens plates as shown in FIGS. 8A, 8B and 8C are combined. The two lens plates are crudely aligned with respect to each other when the projections 34 of one lens plate are allowed to engage with the depressions 36 of the other. For the combination of two resin lens plates as shown in FIGS. 9A, 9B and 9C, the two lens plates are placed between a pair of rigid cylindrical stoppers each having a crest such that the notches 38 of the former engage with the crests of the latter for crude alignment. Or, the two lens plates are placed with respect to each other such that the lengthwise and crosswise sides of one lens plate meet corresponding sides of the other. When two elongated resin lens plates are combined, they tend to be displaced in the lengthwise direction with respect to each other. To prevent such lengthwise displacement, preferably they are stabilized in their lengthwise terminal ends. The shape of the notch is not limited to a V-shape, but may take a U-shape or others.

FIG. 17A is a lateral view of two resin lens plates which are placed with respect to each other for proper alignment before they are stacked as shown in FIG. 9A. FIG. 17B is a plan view of resin lens plates before they are aligned with respect to each other. FIG. 18A is a lateral view of two resin lens plates which are placed with respect to each other for proper alignment before they are stacked. FIG. 18B is a plan view of resin lens plates after they have been aligned with each other.

When two resin lens plates as shown in FIG. 9A are combined and placed between a pair of rigid stoppers each having a crest such that the notches of the lens plates engage with the crests of the adjusters 33, the two lens plates are often subject to bending as shown in FIGS. 18A and 18B. To prevent the occurrence of such inconvenience, it is advisable to prepare a throughhole on each lengthwise end of the elongated resin lens plate, and, when two resin lens plates are combined, the throughholes of the two lens plates receive the insertion of rod-like adjusters 35 as shown in FIGS. 19A and 19B, and FIGS. 20A and 20B, and the two adjusters are displaced in the outward lengthwise directions, thereby pulling outward their respective lengthwise end of the lens plates until proper alignment is achieved.

FIG. 19A is a lateral view of two resin lens plates each having a through-hole at either lengthwise end which will be aligned with respect to each other through the operation of rod-like adjusters inserted into the through-holes. FIG. 19B is a plan view of the resin lens plates before they are aligned to each other. FIG. 20A is a lateral view of the two resin lens plates which have been aligned to each other through the operation of the rod-like adjusters inserted into the through-holes formed on the both lengthwise ends of the two lens plates. FIG. 20B is a plan view of the two resin lens plates after they have been aligned to each other.

FIG. 21A is a sectional view of another pair of resin lens plates which align with respect to each other in a different manner from the one observed in the foregoing example. FIG. 21B is an enlarged view of the part of FIG. 21A designated as F. Each elongated resin lens plate 10 has a semicylindrical line 39 in parallel with each short crosswise end on one surface, and two similar semicylindrical lines 47 on the corresponding sites on the other surface. When two such resin lens plates 10 are combined, they are placed with respect to each other in such a manner as to cause one line surface of one lens plate to face the two line surface of the other, thereby allowing the one line of either crosswise end of the former to be encompassed between the two lines at the corresponding end of the latter and thereby ensuring the proper alignment of the former with respect to the latter.

Proper alignment of two resin lens plates may be achieved by resorting to the following measure: each resin lens plate has a groove along each inter-lenslet bisector on one surface, and a ridge along the corresponding inter-lenslet bisector on the other surface; and two such resin lens plates are placed with respect to each other such that the groove carrying surface of one lens plate faces the ridge carrying surface of the other, so as to allow each groove of the former to engage with the corresponding ridge of the latter as shown in FIG. 6A.

Alternatively, proper alignment of two resin lens plates may be achieved by the following method: each resin lens plate has a groove along each inter-lenslet bisector on both surfaces; two such resin lens plates are placed with respect to each other such that each groove of one lens plate faces the corresponding groove of the other; and a light shielding septum is inserted into a gap between each pair of the opposite grooves as shown in FIG. 7A.

Further alternatively, proper alignment and fixation of two resin lens plates may be achieved by placing two lens plates to be combined in an elongated, planar structure having an internal dimension equal to or larger than the external dimension of the resin lens plates. It is also possible to place two or more resin lens plates in proper alignment with each other by thrusting the lengthwise side of each lens plate opposite to the one where the film gate remain resides against a bumper pin, and by pressing the same side using a spring.

Bonding of resin lens plates may be achieved by applying an adhesive agent to the bonding region 32 of each lens plate as shown in FIG. 8A or 9A.

If adhesion of resin lens plates achieved via bonding of the two opposite bonding regions 32 is suspected to be insufficient, it is preferable to further apply the adhesive agent to indented joining regions provided on the lensless margins. For example, the adhesive agent may be applied to the projection 34 and the depression 36 of each resin lens plate as shown in FIG. 8B.

If adhesion of resin lens plates achieved via bonding of the indented joining regions is found to ensure a sound mechanical fixation, the adhesive agent may be applied only to the indented joining regions.

The material of the adhesive agent may be chosen from those that have a similar property to that of the films coated on the resin lens plate. For example, if the material of the reflection-lowering film coated on the resin lens plate is a fluorine-based resin, the adhesive agent is preferably made from a fluorine-based resin. This is for ensuring the affinity of the adhesive agent to the reflection lowering film.

The adhesive agent should have a property to shrink on hardening, because then it is possible, when two resin lens plates are allowed to face each other to be combined by bonding, to permit the summit of each lenslet of one lens plate to be kept in contact with that of the corresponding lenslet of the other lens plate. The bonding regions 32 have a height equal to or less than that of the lenslet, and thus after the adhesive agent hardens to shrink, the interval between the two resin lens plates is determined by the opposite protruding lenslet spacers as shown in FIG. 1 which butt against each other. If the two resin lens plates do not have any protruding lenslet spacers, the interval between the two will be determined when the summit of each lenslet of one lens plate comes in contact with that of the corresponding lenslet of the other lens plate. The adhesive agent should be light curing. The thermosetting resin should be avoided because if two resin lens plates aligned with each other are fixed by bonding using a thermosetting resin, the two lens plates will be often subject to positioning errors due to distortions developed during fixation. The adhesive agent preferably has a black color so that the object to which the agent is applied can have a reduced scattering of light.

Two resin lens plates are bonded together by ultrasonic adhesion instead of by bonding based on an adhesive agent. FIG. 22A is a plan view of two resin lens plates bonded via ultrasonic excitation. FIG. 22B is a lateral view of the two resin lens plates bonded as above. FIG. 22C is a sectional view of the two resin lens plates cut along the line G–G' of FIG. 22A.

Figure 23A:
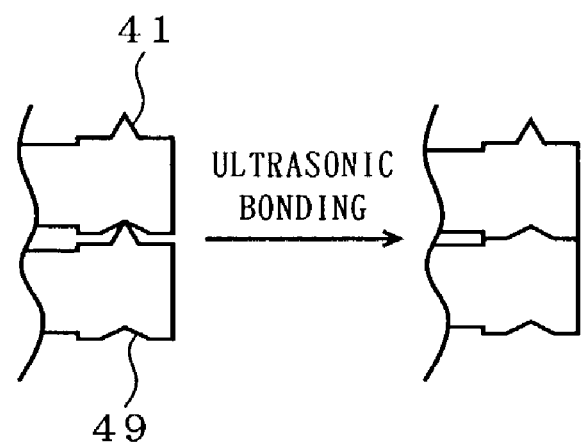
FIG. 23A is an enlarged sectional view of a part designated as H of FIG. 22C representing areas to be bonded of the two resin lens plates for illustrating how the areas are bonded together via ultrasonic excitation.

FIG. 23A is an enlarged sectional view of a part designated as H of FIG. 22C representing areas to be bonded of the two resin lens plates. Each resin lens plate has different bonding regions on the two surfaces: the bonding region on one surface consists of a line of ridge whose profile is an isosceles triangle 41 in which the two isosceles sides have a steeper slope while the counterpart on the other surface consists of a line of ditch whose profile is an isosceles triangle 49 in which the two isosceles sides have a less steep slope. The two resin lens plates are placed one over the other such that the line of ditch of the overlying lens plate fits the line of ridge of the underlying lens plate to bring the summit of the ditch triangle into contact with the summit of the ridge triangle in terms of profile; and a ultrasonic wave is transmitted to the summit 41 of the ridge to melt resin there, thereby modifying the shape of the ridge in conformity with the shape of the ditch to achieve the bonding of the two resin lens plates as shown in FIG. 23A.

Figure 23B:
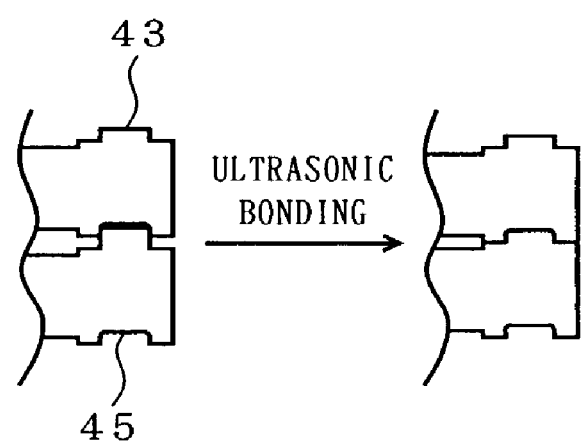
FIG. 23B is an enlarged sectional view of the lengthwise terminal ends of the two resin lens plates to be bonded for illustrating how the ends are bonded together via ultrasonic excitation.

FIG. 23B is an enlarged sectional view of the lengthwise terminal ends of the two resin lens plates for illustrating how the ends are bonded together by comparing the joints before and after bonding. Each resin lens plate has different joints on the two surfaces: the joint on one surface consists of a line of projection 43 whose profile is a rectangle while the counterpart on the other surface consists of a line of groove 45 whose profile is a rectangle, the height of the projection being slightly larger than the depth of the groove. The two resin lens plates are placed one over the other such that the line of groove of the overlying lens plate fits the line of projection of the underlying lens plate to bring the base of the groove rectangle into contact with the summit of the projection rectangle in terms of profile; and a ultrasonic wave is transmitted to the summit 43 of the projection to melt resin there, thereby modifying the shape of the projection in conformity with the shape of the groove to achieve the bonding of the two resin lens plates as shown in FIG. 23B.

If two resin lens plates are combined by ultrasonic bonding, coating them with a hydrophilic film and an adhesive film will be unnecessary.

If it is required to combine two resin lens plates with their lenslet carrying surfaces facing each other, recourse may be taken to the following mechanical means: several throughholes are prepared on the lensless margins of each lens plate, and bonding pins are inserted into the throughholes, thereby fixing the plates; or each resin lens plate has several projection joints on the lensless margins of one surface and several groove joints on the corresponding sites of the other surface, the projection joint being able to engage with the groove joint, and the two resin lens plates are placed one over the other such that the groove joints of the overlying lens plate fit the projection joints of the underlying lens plate, and then the two lens plates are fixed by applying a clip over the joints.

To further ensure the effective elimination of stray light, a further film for eliminating stray light may be inserted between two resin lens plates, before the lens plates are combined.

The film is made from a material allowing a high optical transmission, and has on its surface a light absorbing pattern printed which corresponds with the distribution of inter-lenslet gaps, or the film is made from a material having a low optical transmission and has openings formed through its substance which have a pattern corresponding with the distribution of lenslet apertures.

The erect image lens array obtained by stacking the resin lens plates in the manner as described above may be further provided, on its light impinging and/or light emanating side, with a light shielding septum between each pair of adjacent lenslets of the top or rearmost lens plate standing in essentially parallel with the optical axis of the lenslet so as to inhibit the invasion of stray light.

FIG. 24A is a lateral view of an erect image resin lens array having a septal structure 44 on its surface to receive incident light. FIG. 24B is a lateral view of an erect image resin lens array having septal structures 44 on both of its surfaces, that is, one to receive incident light and the other from which transmitted light exits.

If the erect image resin lens plate is used in combination with a linear optical scanning system for image transmission, what is important is stray light oriented towards the lengthwise direction, that is, the main scanning direction. To cope with such stray light, it is only necessary to implement the septal structure 44 such that it can effectively intercept the stray light oriented towards the lengthwise direction.

The septal structure may comprise a sun-screen structure obtained by vertically arranging multiple thin plates in parallel with each other at regular intervals. The thin plate may be obtained by subjecting a metal or resin plate to an anti-reflection treatment consisting, for example, of forming a light absorbing film thereupon.

The septal structure may further exist as a means by which limits the field angle in the lengthwise direction of the resin lens array. This means is obtained by preparing a light restricting film, which can selectively scatter or absorb incident light having an angle exceeding a certain critical angle, and by applying the film to the lens array such that its field angle restricting direction can coincide with the lengthwise direction of the lens array. Preparation of a light restricting film is achieved by laminating tansparent resin layers and light absorbing resin layers, and then by slicing the layered structure in a direction vertical to lamination to give a film having a specified thickness. However, the light restricting film is not limited to the above one, but may include, for example, a resin film in which molecules have an anisotropy as in anisotropic liquid crystals.

FIG. 25A is a plan view of an image transmission system comprising an erect image resin lens array placed in a housing, the system being for optically writing or reading data. FIG. 25B is a sectional view of the image transmission system cut along the line of I–I' of FIG. 25A. Each resin lens plate is properly placed in the housing by engaging each undercut portion provided on the lateral end surface with the corresponding protrusion or tenon of the housing. Totally surrounding the erect image resin lens array with the housing excepting the aperture inhibits, out of light coming from a source, reflected by an object and incident to the optical system, the entry of stray light, which will not be responsible for the formation of an image, as well as scattered light. The housing receives a light absorbing treatment on its internal surfaces.

The housing 51 has a slit 48 (or aperture) placed between an image forming surface and the uppermost matrix of lenslets extending in the main scanning direction to receive light reflected by an object and impinging towards the lenslets as shown in FIGS. 25A and 25B. The slit 48 is configured so as to reject the entry of light, which will not be responsible for the formation of an image. The width of the slit 48 should be equal to or less than the width of the central lenslet area in the subordinate scanning direction.

The housing 51 is preferably made from a conductor such as metals, or prepared by applying conductive films on the surface of a housing frame such that the conductor or the conductive films can be adjusted in their potential level. If the potential level of the conductor or of the conductive films can be made equal to that of the photo-sensitive body, it will be possible to prevent the migration of toner particles towards the surfaces of the housing, and the adhesion of the particles to the erect image resin lens array.

The slit may be covered with a light transmitting medium such as glass, or an aperture may be prepared on the housing 51 in parallel with the main scanning direction and then the aperture be covered with a light transmitting medium 53 such as glass which has been printed so as to leave the slit 48 as shown in FIG. 25C. By covering the aperture or slit with a light transmitting medium it becomes possible to prevent the adhesion of toner particles to the erect image resin lens array.

The erect image resin lens array may be further provided with a septal structure(s) on its light impinging and/or light emanating side. FIG. 25D is a sectional view of a still other example of the image transmission system in which a light restricting film 55 as described above is introduced between the slit and the erect image resin lens array so as to intercept light too much oriented towards the main scanning direction, or to serve as a means for restricting the entry of, cross-interfering light.

What is claimed is:

1. A resin lens plate having oblong shape comprising:
    A lenslet forming area at the center of one or both of its surfaces where a matrix of convex lenslets each having a spherical or aspherical end surface are regularly arranged such that adjacent lenslets are apart from each other by a specified center-to-center pitch; and
    margins around the central lenslet area where no lenslets are formed,
    wherein each convex lenslet has a quadrangular or hexagonal contour in a plan view of the plate; and the direction in which the center-to-center distance between adjacent lenslets takes a maximum value is in parallel with the lengthwise side of the plate, and
    wherein a transparent conductive film is formed on the surface of the plate in such a manner as to allow the potential level of the transparent conductive film to be adjusted.

2. A resin lens plate as described in claim 1 wherein the convex lenslets are densely packed.

3. A resin lens plate as described in claim 1 wherein the plate has, on one of its lengthwise lateral surfaces, a gate remain which is a remnant of a gate through which resin was injected for injection molding.

4. A resin lens plate as described in claim 1 wherein an undercut for assemblage is provided to a lengthwise lateral surface of said plate.

5. A resin lens plate as described in claim 1 wherein a projection is provided to each margin which is outside the central lenslet area and extends in parallel with the lengthwise side of the lens plate so that, when two such lens plates are combined, the interval between each pair of opposite lenslets can be adjusted.

6. A resin lens plate as described in claim 1 wherein a bonding region is provided to each margin which is outside the central lenslet area and extends in parallel with the lengthwise side of the lens plate, the bonding region having a height equal to or less than that of the convex lenslet.

7. A resin lens plate as described in claim 1 comprising a projection on each lengthwise terminal margin on one surface and a groove on the corresponding site on the other wherein the height of the projection is less in extent than the depth of the groove, and the projection is so similarly prepared in dimension as to be able to engage with the groove.

8. A resin lens plate as descried in claim 1 wherein a notch is prepared on each lengthwise terminal end of the plate.

9. A resin lens plate as described in claim 1 wherein a light absorbing film is formed along the boundary between each pair of adjacent convex lenslets.

10. A resin lens plate as described in claim 1 wherein a light absorbing film having a specified width is formed along the bisector of a center-to-center line drawn between each pair of adjacent convex lenslets.

11. A resin lens plate as described in claim 1 wherein a groove or a ridge is formed along the bisector of a center-to-center line between each pair of adjacent convex lenslets, and a light absorbing film is formed over the groove or the ridge.

12. A resin lens plate as described in claim 1 wherein a groove is formed along the bisector of a center-to-center line between each pair of adjacent convex lenslets; and black ink is introduced into the groove via capillary action to form a light absorbing film over the groove.

13. A resin lens plate as described in claim 1 which has a groove formed along the bisector of a center-to-center line between each pair of adjacent lenslets on one surface and a ridge formed along the bisector of a center-to center line between each pair of adjacent lenslets an the other surface, the groove being able to engage with the ridge, and a light absorbing film is formed over each groove.

14. A resin lens plate as described in claim 1, which has a groove formed along the bisector of a center-to-center line between each pair of adjacent lenslets on both of its surfaces, and a light absorbing film formed over each groove.

15. A resin lens plate as described in claim 13 or 14 wherein the light absorbing film is made from black ink introduced into the groove via capillary action.

16. An erect image resin lens array obtained by stacking two or more resin lens plates as described in claim 1.

17. An erect image resin lens array obtained by stacking two or more resin lens plates as described in claim 13 such that, for each pair of apposed resin lens plates, the groove of one resin lens plate engages with the ridge of the apposite resin lens plate.

18. An erect image resin lens array obtained by stacking two or more resin lens plates as described in claim 14 wherein, for each pair of apposed resin lens plates, a light shielding septum having a thickness equal to or less than the width of the groove is inserted into the space formed by each pair of opposite grooves.

19. An erect image resin lens array as described in claim 16 which has, on its light impinging side or light emanating side, or both its light impinging side and light emanating side, a septal structure extending essentially in parallel with the optical axis of each lenslet for separating, for each lenslet, its image forming space distinctly from those of adjacent lenslets, thereby inhibiting the entry of stray light to the lenslet from the adjacent lenslets.

20. An erect image resin lens array as described in claim 19 wherein the septal structure comprises a structure obtained by arranging plural planar thin plates at regular intervals such that the plate is in parallel with the optical axis of the lenslet and vertical to the lengthwise direction of the lens array.

21. An erect image resin lens array as described in claim 16 which is provided, for inhibiting the entry of stray light, with a field angle restricting means on its light impinging side or light emanating side, or both its light impinging side and light emanating side.

22. An erect image resin lens array as described in claim 21 wherein the field angle restricting means comprises a light restricting film which selectively scatters or absorbs rays of incident light impinging with an angle beyond a specified angle range, and the direction in which the field angle is restricted is in parallel with lengthwise direction of the lens array.

23. An erect image resin lens array as described in claim 16 wherein plural resin lens plates, each of which has, on its flat surface, a pin impression or a print left by a pin of a die which urges the parting of the lens plate from the die, and, on its lateral surface, a gate remain or remnant of a gate for resin injection which was used during injection molding, are stacked such that the pin impressions and the gate remains of all the resin lens plates are similarly oriented.

24. An image transmission system for optical writing or reading obtained by placing an erect image resin lens array as described in claim 16 in a housing which has a thin slit, the slit having a width equal to or less than that of the central lenslet area in the subordinate scanning direction and extending in parallel with the main scanning direction.

25. An image transmission system for optical writing or reading as described in claim 24 wherein the slit is covered with a light transmitting medium.

26. An image transmission system for optical writing or reading as described in claim 24 wherein placement of the erect image resin lens array in the housing is achieved by engaging the undercut portions provided to the peripheral surfaces of the resin lens plates with corresponding projections provided to the housing.

27. An image transmission system for optical writing or reading as described in claim 24 wherein a light restricting film which selectively scatters or absorbs rays of incident light impinging with an angle beyond a specified angle range, is provided between the slit and the erect image resin lens array such that the direction in which the field angle is restricted corresponds with the main scanning direction.

\* \* \* \* \*